US012245009B2

(12) United States Patent
Ishida

(10) Patent No.: US 12,245,009 B2
(45) Date of Patent: Mar. 4, 2025

(54) WIRELESS AUDIO SYSTEM, WIRELESS SPEAKER, AND GROUP JOINING METHOD FOR WIRELESS SPEAKER

(71) Applicant: D&M HOLDINGS INC., Kawasaki (JP)

(72) Inventor: Yasuchika Ishida, Kawasaki (JP)

(73) Assignee: D&M HOLDINGS INC., Kawasaki (JP)

( * ) Notice: Subject to any disclaimer, the term of this patent is extended or adjusted under 35 U.S.C. 154(b) by 0 days.

(21) Appl. No.: 17/625,236

(22) PCT Filed: Mar. 30, 2020

(86) PCT No.: PCT/JP2020/014607

§ 371 (c)(1),
(2) Date: Jan. 6, 2022

(87) PCT Pub. No.: WO2021/014691

PCT Pub. Date: Jan. 28, 2021

(65) Prior Publication Data

US 2022/0303683 A1 Sep. 22, 2022

(30) Foreign Application Priority Data

Jul. 22, 2019 (JP) ................................ 2019-134882

(51) Int. Cl.
*H04R 3/12* (2006.01)
*H04R 5/04* (2006.01)

(52) U.S. Cl.
CPC ................ *H04R 3/12* (2013.01); *H04R 5/04* (2013.01); *H04R 2420/01* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 3,956,591 | A | 5/1976 | Gates, Jr. |
| 4,105,974 | A | 8/1978 | Rogers |
| D260,764 | S | 9/1981 | Castagna et al. |
| 4,306,114 | A | 12/1981 | Callahan |
| 4,509,211 | A | 4/1985 | Robbins |
| D279,779 | S | 7/1985 | Taylor |
| 4,530,091 | A | 7/1985 | Crockett |
| 4,701,629 | A | 10/1987 | Citroen |
| D293,671 | S | 1/1988 | Beaumont |

(Continued)

FOREIGN PATENT DOCUMENTS

| | | |
|---|---|---|
| CA | 2320451 | 3/2001 |
| CN | 1598767 A | 3/2005 |

(Continued)

OTHER PUBLICATIONS

"Plug and Play ISA Specification", Version 1.0a, May 5, 1994, Intel and Microsoft Corporation, 71 pages.

(Continued)

*Primary Examiner* — Qin Zhu
(74) *Attorney, Agent, or Firm* — Knobbe, Martens, Olson & Bear, LLP

(57) ABSTRACT

A system and method for wireless audio data system configuration is disclosed and described herein.

19 Claims, 11 Drawing Sheets

(56) References Cited

U.S. PATENT DOCUMENTS

| | | | |
|---|---|---|---|
| 4,731,814 | A | 3/1988 | Becker et al. |
| 4,824,059 | A | 4/1989 | Butler |
| D301,037 | S | 5/1989 | Matsuda |
| 4,845,751 | A | 7/1989 | Schwab |
| D304,443 | S | 11/1989 | Grinyer et al. |
| D313,023 | S | 12/1990 | Kolenda et al. |
| D313,398 | S | 1/1991 | Gilchrist |
| D313,600 | S | 1/1991 | Weber |
| 4,994,908 | A | 2/1991 | Kuban et al. |
| D320,598 | S | 10/1991 | Auerbach et al. |
| D322,609 | S | 12/1991 | Patton |
| 5,086,385 | A | 2/1992 | Auney et al. |
| D326,450 | S | 5/1992 | Watanabe |
| D327,060 | S | 6/1992 | Wachob et al. |
| 5,151,922 | A | 9/1992 | Weiss |
| D331,388 | S | 12/1992 | Dahnert et al. |
| 5,182,552 | A | 1/1993 | Paynting |
| D333,135 | S | 2/1993 | Wachob et al. |
| 5,237,327 | A | 8/1993 | Saitoh et al. |
| 5,272,757 | A | 12/1993 | Scofield et al. |
| D350,531 | S | 9/1994 | Tsuji |
| D350,962 | S | 9/1994 | Reardon et al. |
| 5,361,381 | A | 11/1994 | Short |
| 5,372,441 | A | 12/1994 | Louis |
| D354,059 | S | 1/1995 | Hendricks |
| D354,751 | S | 1/1995 | Hersh et al. |
| D356,093 | S | 3/1995 | McCauley et al. |
| D356,312 | S | 3/1995 | Althans |
| D357,024 | S | 4/1995 | Tokiyama et al. |
| 5,406,634 | A | 4/1995 | Anderson et al. |
| 5,430,485 | A | 7/1995 | Lankford et al. |
| 5,440,644 | A | 8/1995 | Farinelli et al. |
| D362,446 | S | 9/1995 | Gasiorek et al. |
| 5,457,448 | A | 10/1995 | Totsuka et al. |
| D363,933 | S | 11/1995 | Starck |
| D364,877 | S | 12/1995 | Tokiyama et al. |
| D364,878 | S | 12/1995 | Green et al. |
| D365,102 | S | 12/1995 | Gioscia |
| D366,044 | S | 1/1996 | Hara et al. |
| 5,481,251 | A | 1/1996 | Buys et al. |
| 5,515,345 | A | 5/1996 | Barreira et al. |
| D372,716 | S | 8/1996 | Thorne, III |
| D377,651 | S | 1/1997 | Biasotti et al. |
| 5,625,350 | A | 4/1997 | Fukatsu et al. |
| D379,816 | S | 6/1997 | Laituri et al. |
| 5,640,388 | A | 6/1997 | Woodhead et al. |
| D380,752 | S | 7/1997 | Hanson |
| D382,271 | S | 8/1997 | Akwiwu |
| 5,661,665 | A | 8/1997 | Glass et al. |
| D384,940 | S | 10/1997 | Kono et al. |
| D387,352 | S | 12/1997 | Kaneko et al. |
| D388,792 | S | 1/1998 | Nykerk |
| D389,143 | S | 1/1998 | Wicks |
| D392,641 | S | 3/1998 | Fenner |
| D393,628 | S | 4/1998 | Ledbetter et al. |
| 5,740,235 | A | 4/1998 | Lester et al. |
| 5,742,623 | A | 4/1998 | Nuber et al. |
| D394,659 | S | 5/1998 | Biasotti et al. |
| 5,761,320 | A | 6/1998 | Farinelli et al. |
| 5,774,016 | A | 6/1998 | Ketterer |
| D395,889 | S | 7/1998 | Gerba et al. |
| 5,790,543 | A | 8/1998 | Cloutier |
| D397,996 | S | 9/1998 | Smith |
| 5,812,201 | A | 9/1998 | Yoo |
| 5,818,948 | A | 10/1998 | Gulick |
| D401,587 | S | 11/1998 | Rudolph |
| 5,832,024 | A | 11/1998 | Schotz et al. |
| 5,848,152 | A | 12/1998 | Slipy et al. |
| D404,741 | S | 1/1999 | Schumaker et al. |
| D405,071 | S | 2/1999 | Gambaro |
| 5,875,233 | A | 2/1999 | Cox |
| D406,847 | S | 3/1999 | Gerba et al. |
| D407,071 | S | 3/1999 | Keating |
| 5,905,768 | A | 5/1999 | Maturi et al. |
| D410,927 | S | 6/1999 | Yamagishi |
| D412,337 | S | 7/1999 | Hamano |
| 5,946,343 | A | 8/1999 | Schotz et al. |
| 5,956,025 | A | 9/1999 | Goulden et al. |
| 5,960,006 | A | 9/1999 | Maturi et al. |
| D415,496 | S | 10/1999 | Gerba et al. |
| D416,021 | S | 11/1999 | Godette et al. |
| 5,984,512 | A | 11/1999 | Jones et al. |
| 5,987,611 | A | 11/1999 | Freund |
| 5,990,884 | A | 11/1999 | Douma et al. |
| 5,991,307 | A | 11/1999 | Komuro et al. |
| 5,999,906 | A | 12/1999 | Mercs et al. |
| 6,018,376 | A | 1/2000 | Nakatani |
| D420,006 | S | 2/2000 | Tonino |
| 6,038,614 | A | 3/2000 | Chan et al. |
| 6,046,550 | A | 4/2000 | Ference et al. |
| 6,061,457 | A | 5/2000 | Stockhamer |
| 6,081,266 | A | 6/2000 | Sciammarella |
| 6,088,063 | A | 7/2000 | Shiba |
| D429,246 | S | 8/2000 | Holma |
| D430,143 | S | 8/2000 | Renk |
| 6,101,195 | A | 8/2000 | Lyons et al. |
| D431,552 | S | 10/2000 | Backs et al. |
| D432,525 | S | 10/2000 | Beecroft |
| 6,127,941 | A | 10/2000 | Van Ryzin |
| 6,169,725 | B1 | 1/2001 | Gibbs et al. |
| 6,181,383 | B1 | 1/2001 | Fox et al. |
| 6,195,435 | B1 | 2/2001 | Kitamura |
| 6,208,846 | B1 | 3/2001 | Chen et al. |
| 6,212,282 | B1 | 4/2001 | Mershon |
| 6,246,701 | B1 | 6/2001 | Slattery |
| D444,475 | S | 7/2001 | Levey et al. |
| 6,269,406 | B1 | 7/2001 | Dutcher et al. |
| 6,310,652 | B1 | 10/2001 | Li et al. |
| 6,313,879 | B1 | 11/2001 | Kubo et al. |
| 6,321,252 | B1 | 11/2001 | Bhola et al. |
| D452,520 | S | 12/2001 | Gotham et al. |
| 6,353,172 | B1 | 3/2002 | Fay et al. |
| 6,356,871 | B1 | 3/2002 | Hemkumar et al. |
| 6,418,150 | B1 | 7/2002 | Staats |
| D462,339 | S | 9/2002 | Allen et al. |
| D462,340 | S | 9/2002 | Allen et al. |
| D462,945 | S | 9/2002 | Skulley |
| 6,456,783 | B1 | 9/2002 | Ando et al. |
| 6,466,832 | B1 | 10/2002 | Zuqert et al. |
| 6,469,633 | B1 | 10/2002 | Wachter |
| D466,108 | S | 11/2002 | Glodava et al. |
| 6,487,296 | B1 | 11/2002 | Allen et al. |
| 6,493,832 | B1 | 12/2002 | Itakura et al. |
| D468,297 | S | 1/2003 | Ikeda |
| 6,535,121 | B2 | 3/2003 | Matheny |
| D474,763 | S | 5/2003 | Tozaki et al. |
| 6,571,103 | B1 | 5/2003 | Novakov |
| D475,993 | S | 6/2003 | Meyer et al. |
| D476,643 | S | 7/2003 | Yamagishi |
| D477,310 | S | 7/2003 | Moransais |
| D478,051 | S | 8/2003 | Sagawa |
| D478,069 | S | 8/2003 | Beck et al. |
| D478,896 | S | 8/2003 | Summers |
| 6,611,537 | B1 | 8/2003 | Edens et al. |
| D479,520 | S | 9/2003 | De Saulles |
| D481,056 | S | 10/2003 | Kawasaki et al. |
| 6,636,269 | B1 | 10/2003 | Baldwin |
| 6,653,899 | B2 | 11/2003 | Organvidez et al. |
| 6,654,720 | B1 | 11/2003 | Graham et al. |
| 6,654,956 | B1 | 11/2003 | Trinh et al. |
| 6,684,060 | B1 | 1/2004 | Curtin |
| D486,145 | S | 2/2004 | Kaminski et al. |
| 6,704,421 | B1 | 3/2004 | Kitamura |
| 6,741,961 | B2 | 5/2004 | Lim |
| D491,925 | S | 6/2004 | Griesau et al. |
| D493,148 | S | 7/2004 | Shibata et al. |
| D495,333 | S | 8/2004 | Borsboom |
| 6,778,073 | B2 | 8/2004 | Lutter et al. |
| D496,003 | S | 9/2004 | Spira |
| D496,005 | S | 9/2004 | Wang |
| D496,335 | S | 9/2004 | Spira |
| D497,363 | S | 10/2004 | Olson et al. |
| D499,086 | S | 11/2004 | Polito |
| 6,816,510 | B1 | 11/2004 | Banerjee |

(56) References Cited

U.S. PATENT DOCUMENTS

| | | | |
|---|---|---|---|
| 6,826,283 | B1 | 11/2004 | Wheeler et al. |
| D499,395 | S | 12/2004 | Hsu |
| D499,718 | S | 12/2004 | Chen |
| D500,015 | S | 12/2004 | Gubbe |
| D501,477 | S | 2/2005 | Hall |
| 6,859,460 | B1 | 2/2005 | Chen |
| 6,859,538 | B1 | 2/2005 | Voltz |
| 6,873,862 | B2 | 3/2005 | Reshefsky |
| D504,872 | S | 5/2005 | Uehara et al. |
| D504,885 | S | 5/2005 | Zhang et al. |
| 6,901,439 | B1 | 5/2005 | Bonasia et al. |
| D506,463 | S | 6/2005 | Daniels |
| 6,915,347 | B2 | 7/2005 | Hanko et al. |
| 6,919,771 | B2 | 7/2005 | Nakajima |
| 6,931,557 | B2 | 8/2005 | Togawa |
| 6,937,988 | B1 | 8/2005 | Hemkumar et al. |
| 6,987,767 | B2 | 1/2006 | Saito |
| 6,987,947 | B2 | 1/2006 | Richenstein et al. |
| D515,072 | S | 2/2006 | Lee |
| D515,557 | S | 2/2006 | Okuley |
| D518,475 | S | 4/2006 | Yang et al. |
| 7,046,677 | B2 | 5/2006 | Monta et al. |
| D524,296 | S | 7/2006 | Kita |
| D527,375 | S | 8/2006 | Flora et al. |
| 7,092,528 | B2 | 8/2006 | Patrick et al. |
| 7,096,169 | B2 | 8/2006 | Crutchfield, Jr. |
| 7,120,168 | B2 | 10/2006 | Zimmermann |
| 7,130,316 | B2 | 10/2006 | Kovacevic |
| 7,136,934 | B2 | 11/2006 | Carter et al. |
| 7,139,981 | B2 | 11/2006 | Mayer et al. |
| 7,146,260 | B2 | 12/2006 | Preston et al. |
| 7,154,381 | B2 | 12/2006 | Lang et al. |
| 7,161,939 | B2 | 1/2007 | Srael et al. |
| 7,197,148 | B2 | 3/2007 | Nourse et al. |
| 7,206,618 | B2 | 4/2007 | Latto et al. |
| 7,263,110 | B2 | 8/2007 | Fujishiro |
| 7,295,548 | B2 | 11/2007 | Blank et al. |
| 7,302,644 | B2 | 11/2007 | Holtz et al. |
| 7,305,694 | B2 | 12/2007 | Commons et al. |
| 7,308,188 | B2 | 12/2007 | Namatame |
| 7,324,857 | B2 | 1/2008 | Goddard |
| 7,366,206 | B2 | 4/2008 | Lockridge et al. |
| 7,428,310 | B2 | 9/2008 | Park |
| 7,472,058 | B2 | 12/2008 | Tseng et al. |
| 7,492,912 | B2 | 2/2009 | Chung et al. |
| 7,505,889 | B2 | 3/2009 | Salmonsen et al. |
| 7,548,851 | B1 | 6/2009 | Lau et al. |
| 7,558,224 | B1 | 7/2009 | Surazski et al. |
| 7,558,635 | B1 | 7/2009 | Thiel et al. |
| 7,627,825 | B2 | 12/2009 | Kakuda |
| 7,630,501 | B2 | 12/2009 | Blank et al. |
| 7,653,344 | B1 | 1/2010 | Feldman et al. |
| 7,668,964 | B2 | 2/2010 | Millington |
| 7,675,943 | B2 | 3/2010 | Mosig |
| 7,676,044 | B2 | 3/2010 | Sasaki et al. |
| 7,676,142 | B1 | 3/2010 | Hung |
| 7,688,306 | B2 | 3/2010 | Wehrenberg et al. |
| 7,721,032 | B2 | 5/2010 | Bushell et al. |
| 7,746,906 | B2 | 6/2010 | Jinzaki et al. |
| 7,761,176 | B2 | 7/2010 | Ben-Yaacov et al. |
| 7,792,311 | B1 | 9/2010 | Holmgren et al. |
| 7,831,054 | B2 | 11/2010 | Ball et al. |
| 7,853,341 | B2 | 12/2010 | McCarty et al. |
| 7,933,418 | B2 | 4/2011 | Morishima |
| 7,945,636 | B2 | 5/2011 | Nelson et al. |
| 7,945,708 | B2 | 5/2011 | Ohkita |
| 7,966,388 | B1 | 6/2011 | Pugaczewski et al. |
| 7,987,294 | B2 | 7/2011 | Bryce et al. |
| 7,995,732 | B2 | 8/2011 | Koch et al. |
| 8,024,055 | B1 | 9/2011 | Holmgren et al. |
| 8,041,062 | B2 | 10/2011 | Cohen et al. |
| 8,050,203 | B2 | 11/2011 | Jacobsen et al. |
| 8,150,079 | B2 | 4/2012 | Maeda et al. |
| 8,170,222 | B2 | 5/2012 | Dunko |
| 8,233,029 | B2 | 7/2012 | Yoshida et al. |
| 8,311,226 | B2 | 11/2012 | Lorgeoux et al. |
| 8,374,595 | B2 | 2/2013 | Chien et al. |
| 8,411,883 | B2 | 4/2013 | Matsumoto |
| 8,442,239 | B2 | 5/2013 | Bruelle-Drews |
| 8,477,958 | B2 | 7/2013 | Moeller et al. |
| 8,483,853 | B1 | 7/2013 | Lambourne |
| 8,565,455 | B2 | 10/2013 | Worrell et al. |
| 8,600,084 | B1 | 12/2013 | Garrett |
| 8,654,995 | B2 | 2/2014 | Silber et al. |
| 8,861,739 | B2 | 10/2014 | Ojanpera |
| 8,942,395 | B2 | 1/2015 | Lissaman et al. |
| 9,042,556 | B2 | 5/2015 | Kallai et al. |
| 9,130,771 | B2 | 9/2015 | Millington et al. |
| 9,195,258 | B2 | 11/2015 | Millington |
| 9,202,509 | B2 | 12/2015 | Kallai et al. |
| 9,213,357 | B2 | 12/2015 | Millington |
| 9,219,959 | B2 | 12/2015 | Kallai et al. |
| 2001/0043456 | A1 | 11/2001 | Atkinson |
| 2001/0050991 | A1 | 12/2001 | Eves |
| 2002/0072816 | A1 | 6/2002 | Shdema et al. |
| 2002/0072817 | A1 | 6/2002 | Champion |
| 2002/0078293 | A1 | 6/2002 | Kou et al. |
| 2002/0083172 | A1 | 6/2002 | Knowles et al. |
| 2002/0083342 | A1 | 6/2002 | Webb et al. |
| 2002/0101357 | A1 | 8/2002 | Gharapetian |
| 2002/0112084 | A1 | 8/2002 | Deen et al. |
| 2002/0124097 | A1 | 9/2002 | Isely et al. |
| 2002/0131761 | A1 | 9/2002 | Kawasaki et al. |
| 2002/0137505 | A1 | 9/2002 | Eiche et al. |
| 2002/0150053 | A1 | 10/2002 | Gray, III et al. |
| 2002/0165921 | A1 | 11/2002 | Sapieyevski |
| 2003/0014486 | A1 | 1/2003 | May |
| 2003/0023411 | A1 | 1/2003 | Witmer et al. |
| 2003/0043856 | A1 | 3/2003 | Lakaniemi et al. |
| 2003/0046703 | A1 | 3/2003 | Knowles et al. |
| 2003/0063755 | A1 | 4/2003 | Nourse et al. |
| 2003/0073432 | A1 | 4/2003 | Meade, II |
| 2003/0103088 | A1 | 6/2003 | Dresti et al. |
| 2003/0167335 | A1 | 9/2003 | Alexander |
| 2003/0179780 | A1 | 9/2003 | Walker et al. |
| 2003/0185400 | A1 | 10/2003 | Yoshizawa et al. |
| 2003/0198257 | A1 | 10/2003 | Sullivan et al. |
| 2003/0219007 | A1 | 11/2003 | Barrack et al. |
| 2003/0231208 | A1 | 12/2003 | Hanon et al. |
| 2004/0001591 | A1 | 1/2004 | Mani et al. |
| 2004/0014426 | A1 | 1/2004 | Moore |
| 2004/0019807 | A1 | 1/2004 | Freund |
| 2004/0037433 | A1 | 2/2004 | Chen |
| 2004/0042629 | A1 | 3/2004 | Mellone et al. |
| 2004/0171346 | A1 | 9/2004 | Lin |
| 2004/0177167 | A1 | 9/2004 | Iwamura et al. |
| 2004/0183827 | A1 | 9/2004 | Putterman et al. |
| 2004/0185773 | A1 | 9/2004 | Gerber et al. |
| 2004/0223622 | A1 | 11/2004 | Lindemann et al. |
| 2004/0249490 | A1 | 12/2004 | Sakai |
| 2004/0252400 | A1 | 12/2004 | Blank et al. |
| 2005/0060435 | A1 | 3/2005 | Xue et al. |
| 2005/0131558 | A1 | 6/2005 | Braithwaite et al. |
| 2005/0154766 | A1 | 7/2005 | Huang et al. |
| 2005/0160270 | A1 | 7/2005 | Goldberg et al. |
| 2006/0072489 | A1 | 4/2006 | Toyoshima |
| 2006/0222186 | A1 | 10/2006 | Paige et al. |
| 2006/0227985 | A1 | 10/2006 | Kawanami |
| 2006/0259649 | A1 | 11/2006 | Hsieh et al. |
| 2006/0270395 | A1 | 11/2006 | Dhawan et al. |
| 2007/0087686 | A1 | 4/2007 | Holm et al. |
| 2007/0142944 | A1 | 6/2007 | Goldberg et al. |
| 2008/0075295 | A1 | 3/2008 | Mayman et al. |
| 2008/0205070 | A1 | 8/2008 | Osada |
| 2008/0303947 | A1 | 12/2008 | Ohnishi et al. |
| 2009/0011798 | A1 | 1/2009 | Yamada |
| 2009/0060219 | A1 | 3/2009 | Inohara |
| 2009/0070434 | A1 | 3/2009 | Himmelstein |
| 2009/0124289 | A1 | 5/2009 | Nishida |
| 2009/0169030 | A1 | 7/2009 | Inohara |
| 2010/0087089 | A1 | 4/2010 | Struthers et al. |
| 2011/0001632 | A1 | 1/2011 | Hohorst |
| 2011/0316768 | A1 | 12/2011 | McRae |

(56) References Cited

U.S. PATENT DOCUMENTS

| | | | | |
|---|---|---|---|---|
| 2012/0117200 | A1* | 5/2012 | Millington | H04L 65/80 709/219 |
| 2015/0205805 | A1 | 7/2015 | Gossain et al. | |
| 2015/0286360 | A1 | 10/2015 | Wachter | |
| 2015/0365987 | A1 | 12/2015 | Weel | |
| 2016/0196106 | A1* | 7/2016 | Hammer | H04R 3/12 381/79 |
| 2018/0020400 | A1 | 1/2018 | Young | |
| 2021/0185101 | A1* | 6/2021 | Millington | H04L 65/1069 |
| 2023/0098804 | A1* | 3/2023 | Fullerton | G06F 3/165 709/217 |

FOREIGN PATENT DOCUMENTS

| | | | |
|---|---|---|---|
| EP | 1312188 | | 5/2003 |
| EP | 1410686 | | 4/2004 |
| EP | 1416687 | | 5/2004 |
| EP | 1517464 | A2 | 3/2005 |
| EP | 0742674 | B1 | 4/2014 |
| JP | 2000149391 | A | 5/2000 |
| JP | 2013-158045 | A | 8/2013 |
| JP | 2019-004479 | A | 1/2019 |
| NO | 2007135581 | | 11/2007 |
| TW | 439027 | B | 6/2001 |
| WO | 1999023560 | | 5/1999 |
| WO | 2000019693 | | 4/2000 |
| WO | 2008082350 | | 7/2008 |

OTHER PUBLICATIONS

"RTP: A Transport Protocol for Real-Time Applications", Audio-Video Transport Working Group, Lawrence Berkeley National Laboratory, Jan. 1996, 76 pages.

"Sonos Inc.'s Amended Responses to Defendant D&M Holdings Inc.'s First Set of Interrogatories (Nos. 1-11) to Plaintiff", Civil Action No. 14-1330-RGA, Oct. 10, 2016, 36 pages.

"UPnP AV Architecture:1", Version 1.0, Jun. 25, 2002, Intel and Microsoft Corporation, 22 pages.

Jeronimo, et al., "UPnP Design by Example—A Software Developer's Guide to Universal Plug and Play", Intel Press. 511 pages.

"Universal Plug and Play Device Architecture", Version 1.0, Jun. 8, 2000, Microsoft Corporation, 54 pages.

"AVTransport: 1 Service Template Version 1.01", Version 1.0, Jun. 25, 2002, Microsoft Corporation, Philips Electronics, and Pioneer Research Center, 67 pages.

"Microsoft WinHEC—Intel Development Tools for Implementing UPnP Devices", Microsoft Windows Hardware Engineering Conference, 2003, 14 pages.

"Microsoft Windows XP Operating System—File and Printer Sharing with Microsoft Windows", Microsoft Corporation, Nov. 2002, 65 pages.

"Symantec pcAnywhere User's Guide", Version 10.5.1, Symantec Corporation, 1995-2002, 154 pages.

Mills, David L., "Network Time Protocol (Version 3) Specification, Implementation and Analysis", University of Delaware, Mar. 1992, 120 pages.

"SMPTE Made Simple—A Time Code Tutor by TimeLine", TimeLine Vista, Inc., 1996, 46 pages.

Niederst, Jennifer, "O'Reilly—Web Design in a Nutshell", Second Edition, Sep. 2001, 678 pages.

"Real Time Streaming Protocol (RTSP)", Network Working Group, RealNetworks, Apr. 1998, 92 pages.

International Search Report for PCT/JP2020/014607 dated Jun. 23, 2020 (2 pages).

Written Opinion for PCT/JP2020/014607 dated Jun. 23, 2020 (3 pages).

* cited by examiner

FIG. 6

GROUP INFORMATION STORAGE UNIT 106

GROUP INFORMATION TABLE 1061

10611 10612 10614 10613

| GROUP NAME | GROUP A | |
|---|---|---|
| SPEAKER ID | ADDRESS INFORMATION | MASTER FLAG |
| 1－1 | ********* | ○ |
| 1－2 | ********* | NULL |
| 1－3 | ********* | NULL |
| 1－6 | ********* | NULL |
| 1－7 | ********* | NULL |

10610 (each row)

SUBGROUP INFORMATION TABLE 1062

10621 10622

| SPEAKER ID | ADDRESS INFORMATION |
|---|---|
| 1－6 | ********* |
| 1－7 | ********* |

10620 (each row)

GROUP JOINING REQUEST PROCESSING

WIRELESS AUDIO SYSTEM, WIRELESS SPEAKER, AND GROUP JOINING METHOD FOR WIRELESS SPEAKER

RELATED APPLICATIONS

The present application claims benefit of and priority to International Application No. PCT/JP2020/014607, filed Mar. 30, 2020, which claims priority to and benefit of Japanese Patent Application No. 2019-134882, filed Jul. 22, 2019, each of which is hereby incorporated by reference for all purposes, as if set forth herein in its entirety.

TECHNICAL FIELD

The present invention relates to a wireless audio system having a configuration in which a group is formed from one or more wireless speakers and audio data is reproduced for each group separately, and more particularly, to a group joining technology for a wireless speaker.

BACKGROUND ART

In Patent Literature 1, there is disclosed a wireless audio system having a configuration in which a group is formed from one or more wireless speakers and audio data is reproduced for each group separately. In this wireless audio system, arbitration is conducted for each group by a plurality of wireless speakers belonging to the group to select one wireless speaker out of the wireless speakers belonging to the group, and the selected wireless speaker serves as a master (group leader). Audio data of the same tune is output from the plurality of wireless speakers belonging to the same group by downloading the audio data from a media server or other sources to the master to reproduce the audio data, and then transmitting the reproduced data from the master to the other wireless speakers belonging to the same group as that of the master.

CITATION LIST

Patent Literature

[PTL 1] U.S. Pat. No. 7,987,294 B2

SUMMARY OF INVENTION

Technical Problem

Incidentally, in the wireless audio system described in Patent Literature 1, when a wireless speaker is to newly join an existing group in order to, for example, reproduce audio data of a tune being played on a group of a plurality of wireless speakers set up in a living room, with a wireless speaker set up in one's room, it is required to execute regrouping through, for example, activation of application software of a controller installed in a smartphone or a similar information terminal and operation of additionally specifying the wireless speaker that is to newly join the existing group. Consequently, a cumbersome work is required.

The present invention has been made in view of the circumstance described above, and an object thereof is to accomplish joining of a wireless speaker to a group by simple operation in a wireless audio system having a configuration in which a group is formed from one or more wireless speakers and audio data is reproduced for each group separately.

Solution to Problem

In order to solve the problem described above, according to one embodiment of the present invention, a wireless speaker searches for masters. When given group joining operation is received from a user with a press of a button, an audio command, or the like, the wireless speaker transmits a group joining request to one of the masters and joins a group to which the one of the masters belongs. When the wireless speaker that has received the group joining operation belongs to one of groups, the wireless speaker transmits a group leaving request to a master of this group to leave this group, and then transmits a group joining request to one of the masters other than the transmission destination of the group leaving request to join a group to which the one of the masters belongs.

A wireless speaker set as a master receives a group joining request from another wireless speaker, and adds the wireless speaker that is a sender of the group joining request to the master's own group. When the wireless speaker is added during reproduction of audio data, the master transmits the reproduced data to the added wireless speaker as well. The wireless speaker set as a master also receives a group leaving request from another wireless speaker that is a member of the master's own group, and removes the wireless speaker that is a sender of the group leaving request from the master's own group. When the wireless speaker is removed during reproduction of audio data, the master stops transmission of the reproduced data to the removed wireless speaker.

For example, according to one embodiment of the present invention, there is provided a wireless audio system having a configuration in which each of groups is formed from one or more wireless speakers, and masters are selected for the groups on a one-to-one basis so that one master selected for a group from the one or more wireless speakers belonging to the group reproduces audio data and transmits the reproduced audio data to each of the one or more wireless speakers belonging to the group, wherein each of the wireless speakers includes: master search means configured to search for the masters; group joining request means configured to transmit, when given group joining operation is received from a user and the each of the wireless speakers does not belong to any of the groups, a group joining request to one of the masters found through a search by the master search means to join one of the groups to which the one of the masters belongs, and to transmit, when the given group joining operation is received from the user and the each of the wireless speakers belongs to one of the groups, a group leaving request to the master of the one of the groups to leave the one of the groups, and transmit a group joining request to one of the masters that is found through the search by the master search means and is other than the master of the one of the groups, to join a group to which the one of the masters belongs; group joining means configured to add, when the each of the wireless speakers is set as the master and a group joining request is received from another of the wireless speakers, the wireless speaker that is a sender of the group joining request to a group of the each of the wireless speakers; group leaving means configured to remove, when the each of the wireless speakers is set as the master and a group leaving request is received from one of the other wireless speakers belonging to the group of the each of the wireless speakers, the wireless speaker that is a sender of the group leaving request from the group of the each of the wireless speakers; and audio transmission control means configured to transmit, when the each of the wireless speakers is set as the master and one of the other wireless speakers is added to the group of the each of the wireless speakers by the group joining means during reproduction of audio data, the reproduced audio data to the added wireless speaker, and to stop, when the each of the wireless speakers is set as the master and one of the other wireless speakers is removed from the group of the each of the wireless speakers by the group leaving means, transmission of the reproduced data to the removed wireless speaker.

Advantageous Effects of Invention

According to the present invention, when each wireless speaker receives the given group joining operation from the user and the wireless speaker does not belong to any of the groups, the wireless speaker transmits the group joining request to one of the masters to join a group to which the one of the masters belongs, and transmits, when the wireless speaker belongs to one of the groups, the group leaving request to a master of the one of the groups to leave the group, and then transmits the group joining request to one of the masters other than the transmission destination of the group leaving request to join a group to which the one of the masters belongs. It is therefore unrequired to go to the trouble of activating and operating the application software of the controller installed in a smartphone or a similar information terminal for joining of the wireless speaker to one of the groups. In addition, immediate output of reproduced data of audio data being reproduced in the group newly joined by the wireless speaker enables the user to determine the group joined by the wireless speaker by checking the audio data being reproduced. According to the present invention, joining of a wireless speaker to a group is thus accomplished by simple operation.

BRIEF DESCRIPTION OF DRAWINGS

FIG. 6 is a diagram for schematically illustrating an example of registered contents of a group information storage unit (106).

DESCRIPTION OF EMBODIMENTS

Now, one embodiment of the present invention is described with reference to the drawings.

Figure 1:
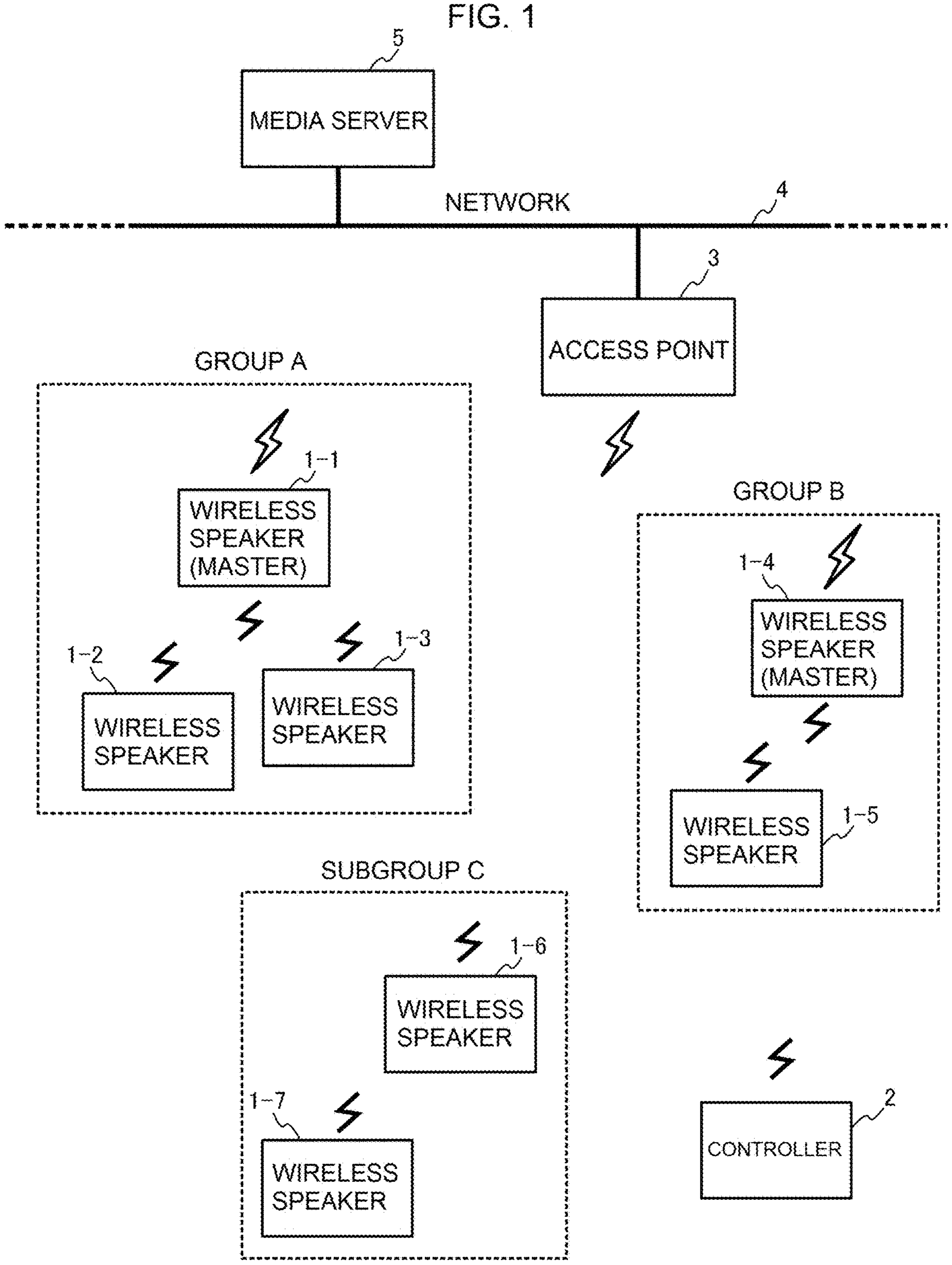
FIG. 1 is a diagram of a schematic configuration of a wireless audio system according to one embodiment of the present invention.

FIG. 1 is a diagram of a schematic configuration a wireless audio system according to the one embodiment of the present invention.

As illustrated in the figure, the wireless audio system according to this embodiment includes a plurality of wireless speakers 1-1 to 1-7 (hereinafter simply referred to as "wireless speakers 1") and a controller 2 connected by wireless connection to the wireless speakers 1 via an access point 3.

One or more wireless speakers 1 form a group or a subgroup. Here, the wireless speakers 1-1 to 1-3 form Group A, the wireless speakers 1-4 and 1-5 form Group B, and the wireless speakers 1-6 and 1-7 form Subgroup C.

The controller 2 is used to remotely perform various types of operation including grouping of the wireless speakers 1, setting of masters, and issuing of an instruction to reproduce audio data to the masters, and is implemented by, for example, application software of a controller installed in a smartphone or a similar information terminal.

In the wireless audio system according to this embodiment, a master of Group A is selected from the wireless speakers 1 belonging to Group A and a master of Group B is selected from the wireless speakers 1 belonging to Group B. In each of Group A and Group B, the master downloads audio data from a media server 5 via the access point 3 and a network 4, which is a WAN, a LAN, or the like, to reproduce and output the audio data and also to transmit the reproduced data to each of the wireless speakers 1 belonging to Group A or B. The wireless speakers 1 other than the master receive the reproduced data from the master belonging to one of Group A and Group B that is the same group as the group of the wireless speakers 1, and output the reproduced data. Reproduction of audio data is thus executed for each of Group A and Group B separately. Here, the wireless speaker 1-1 is set as the master of Group A and the wireless speaker 1-4 is set as the master of Group B.

In the wireless audio system according to this embodiment, Subgroup C joins one of Group A and Group B in accordance with a user's instruction. With the joining, the wireless speakers 1-6 and 1-7 belonging to Subgroup C receive reproduced data from the master of the one of Group A and Group B that is a group joined by Subgroup C, and output the reproduced data.

Figure 2:
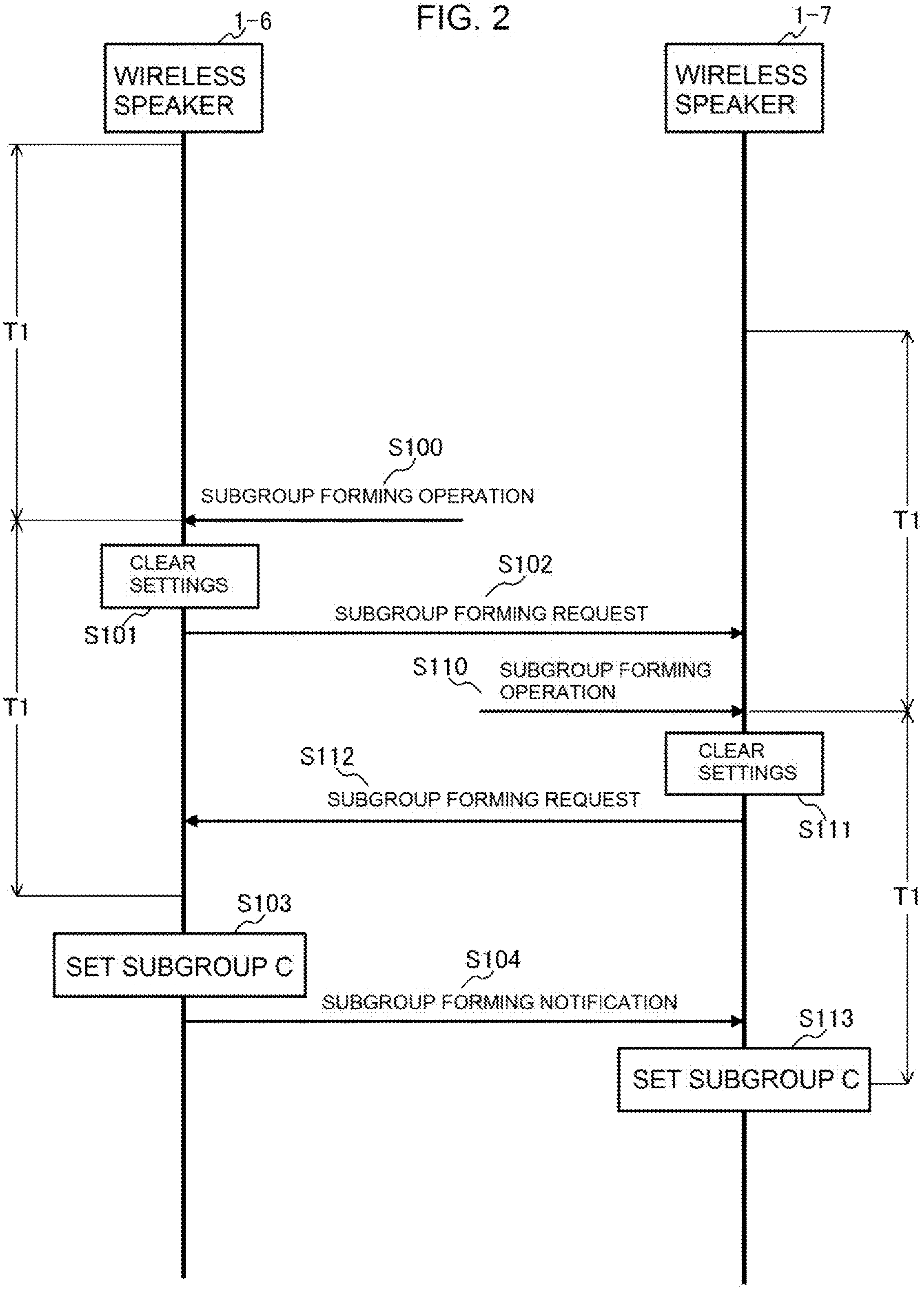
FIG. 2 is a sequence diagram for illustrating an example of subgroup forming operation in the wireless audio system according to the one embodiment of the present invention.

FIG. 2 is a sequence diagram for illustrating an example of subgroup forming operation in the wireless audio system according to this embodiment.

Here, an example of operation to be executed when the wireless speakers 1-6 and 1-7 form Subgroup C is shown.

First, the wireless speaker 1-6 receives given subgroup forming operation, which is a long press (a press lasting, for example, 5 seconds or longer) of an operation button or the like, from the user (Step S100). With the reception of the subgroup forming operation, the wireless speaker 1-6 clears settings registered in itself about a subgroup (Step S101). The wireless speaker 1-6 then multicasts a subgroup forming request by Bluetooth (trademark) or other standards of near field communication (Step S102), and subsequently waits for reception of a subgroup forming notification from another wireless speaker 1, or elapse of a given time T1 (for example, 10 seconds) since the reception of the subgroup forming operation.

Here, the given time T1 has elapsed since the reception of the subgroup forming operation, without the wireless speaker 1-6 receiving a subgroup forming notification from another wireless speaker 1. The wireless speaker 1-7 multicasts a subgroup forming request in Step S112 described next, within the given time T1 before and after the reception of the subgroup forming operation by the wireless speaker 1-6. The wireless speaker 1-6 receives the subgroup forming request from the wireless speaker 1-7 within the given time T1 before and after the reception of the subgroup forming operation, forms Subgroup C including the wireless speaker 1-6 itself and the wireless speaker 1-7 in response to the request, and sets information about Subgroup C in the wireless speaker 1-6 itself (Step S103). The wireless speaker 1-6 then transmits a subgroup forming notification including the information about Subgroup C to the wireless speaker 1-7 (Step S104).

Meanwhile, the wireless speaker 1-7 receives the given subgroup forming operation from the user as in the wireless speaker 1-6, at timing a little later than that of the wireless speaker 1-6 (however, within the given time T1) (Step S110). In response, the wireless speaker 1-7 clears settings of a subgroup registered in itself (Step S111). The wireless speaker 1-7 then multicasts a subgroup forming request by Bluetooth (trademark) or other standards of near field communication (Step S112), and subsequently waits for reception of a subgroup forming notification from another wireless speaker 1, or elapse of the given time T1 (for example, 10 seconds) since the reception of the subgroup forming operation.

Here, a subgroup forming notification has been received from the wireless speaker 1-6 before the elapse of the given time T1 since the reception of the subgroup forming operation. In this case, the wireless speaker 1-7 sets information of Subgroup C which is included in the subgroup forming notification received from the wireless speaker 1-6 to itself (Step S113).

In this manner, Subgroup C including the wireless speakers 1-6 and 1-7 is formed and, in each of the wireless speakers 1-6 and 1-7, information of Subgroup C to which the own wireless speaker 1 belongs is set.

Figure 3:
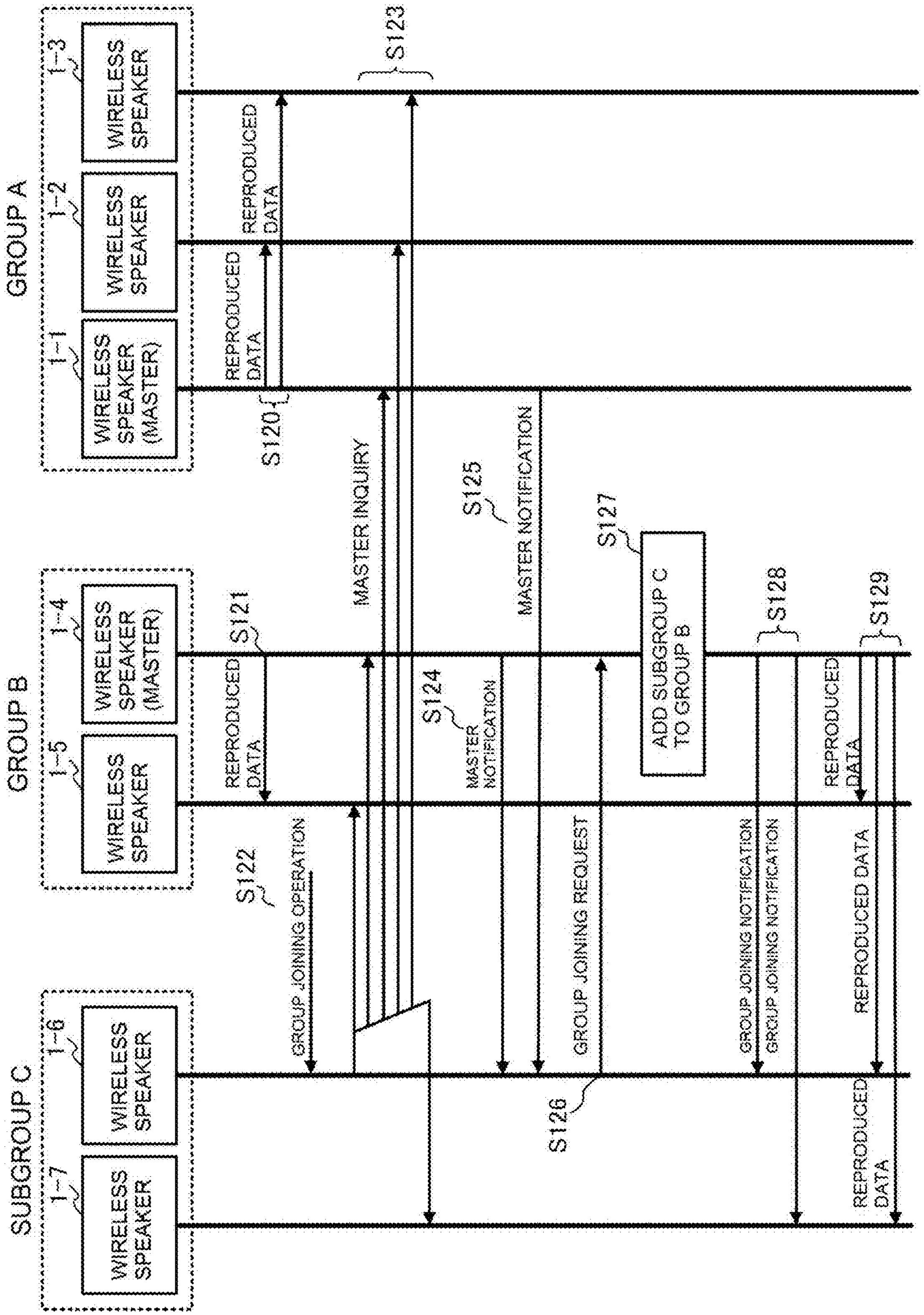
FIG. 3 is a sequence diagram for illustrating an example of group joining operation in the wireless audio system according to the one embodiment of the present invention.
Figure 4:
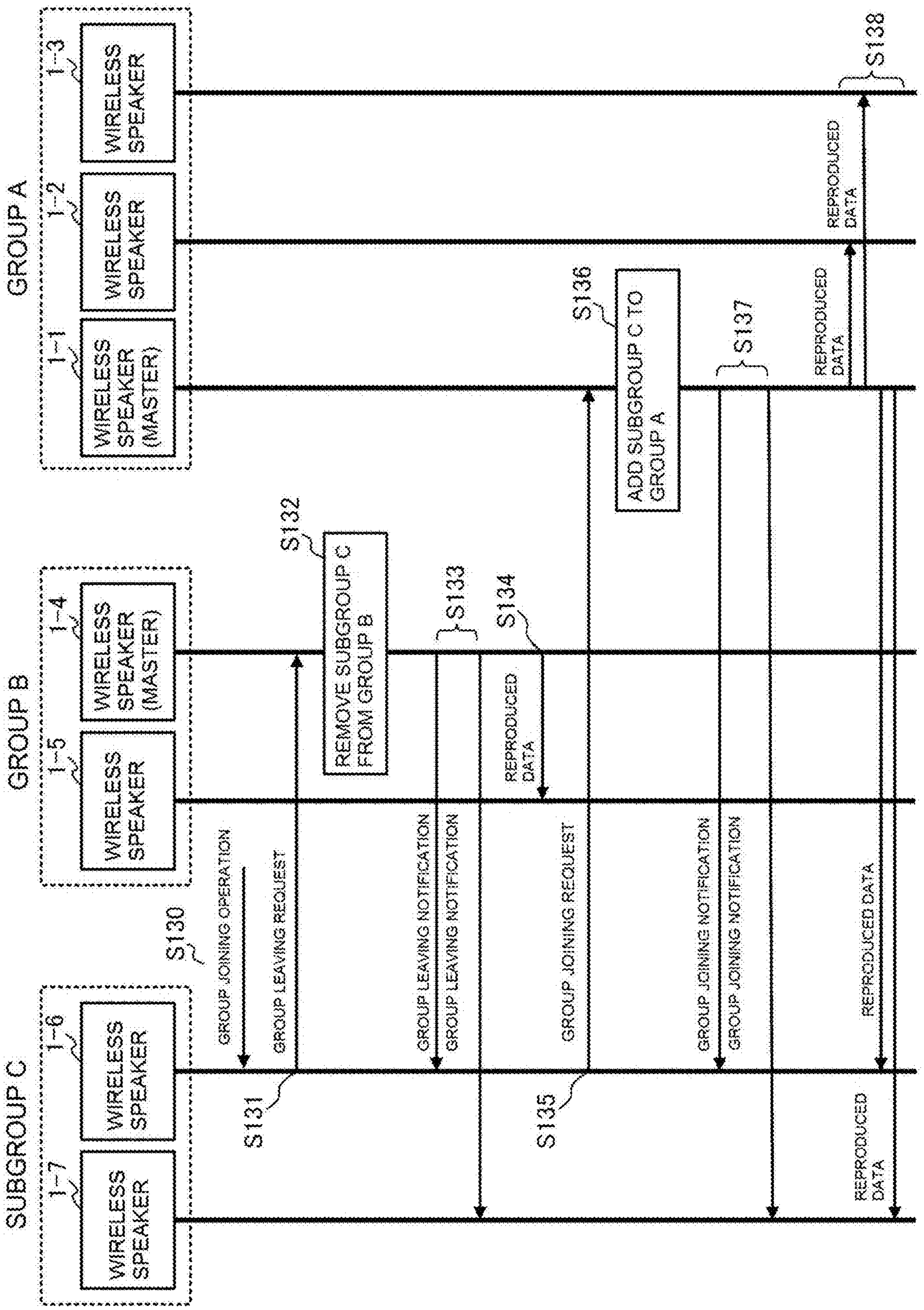
FIG. 4 is a sequence diagram for illustrating the example of the group joining operation in the wireless audio system according to the one embodiment of the present invention, and is a continuation of FIG. 3.

FIG. 3 and FIG. 4 are sequence diagrams for illustrating an example of group joining operation in the wireless audio system according to this embodiment.

The wireless speaker 1-1, which is the master of Group A, reproduces and outputs audio data, and also transmits the reproduced data to the other wireless speakers of the same Group A, namely, the wireless speakers 1-2 and 1-3, by near field communication to output the reproduced data from the wireless speakers 1-2 and 1-3 (Step S120). The wireless speaker 1-4, which is the master of Group B, reproduces and outputs audio data, and also transmits the reproduced data to the other wireless speaker of the same Group B, namely, the wireless speaker 1-5, by near field communication to output the reproduced data from the wireless speaker 1-5 (Step S121).

The wireless speaker 1-6 of Subgroup C now receives given group joining operation, which is a short press (a press lasting, for example, less than 1 second) of an operation button or the like, from the user (Step S122). In response, the wireless speaker 1-6 confirms its own state of not belonging to any group, that is, absence of settings of a group registered in itself, and multicasts a master inquiry by near field communication (Step S123). The wireless speaker 1-6 then waits for a given length of time (for example, 5 seconds), for master notifications transmitted from the master of Group A and the master of Group B.

Next, the wireless speaker 1-4, which is the master of Group B, receives the master inquiry from the wireless speaker 1-6 and transmits a master notification including information of Group B to the wireless speaker 1-6 by near field communication (Step S124). Similarly, the wireless speaker 1-1, which is the master of Group A, receives the master inquiry from the wireless speaker 1-6 and transmits a master notification including information of Group A to the wireless speaker 1-6 by near field communication (Step S125).

Next, the wireless speaker 1-6 receives the master notifications from the wireless speakers 1-1 and 1-4, and selects a master of a group to join from the wireless speakers 1-1 and 1-4 in a given order (for example, an order of reception of the master notifications). Here, the wireless speaker 1-4, which is the source of transmission of the master notification received first, is selected as the master of the group to join. The wireless speaker 1-6 then confirms its own state of belonging to Subgroup C, that is, presence of settings of Subgroup C registered in itself, and transmits a group joining request including information of Subgroup C (address information or the like of the wireless speakers 1-6 and 1-7 belonging to Subgroup C) to the selected wireless speaker 1-4 by near field communication (Step S126).

The wireless speaker 1-4, which is the master of Group B, receives the group joining request from the wireless speaker 1-6, and adds the wireless speakers 1-6 and 1-7 of Subgroup C which are identified from the information included in the group joining request to group members of its own group B (Step S127).

The wireless speaker 1-4 then transmits a group joining notification including information of Group B to each of the wireless speakers 1-6 and 1-7 of Subgroup C (Step S128). The wireless speaker 1-4 adds the wireless speakers 1-6 and 1-7 to transmission destinations of reproduced data of audio data, and transmits the reproduced data of the audio data to the wireless speakers 1-5 to 1-7 by near field communication (Step S129). In this manner, the wireless speakers 1-6 and 1-7 of Subgroup C joins Group B and outputs audio data being reproduced in Group B.

Next, the wireless speaker 1-6 again receives the given group joining operation from the user (Step S130). In response, the wireless speaker 1-6 confirms its own state of having joined Group B, that is, presence of settings of Group B registered in itself, and also confirms its own state of belonging to Subgroup C, that is, presence of settings of Subgroup C registered in itself. The wireless speaker 1-6 then transmits, by near field communication, a group leaving request including information of Subgroup C to the wireless speaker 1-4, which is the master of Group B (Step S131).

The wireless speaker 1-4, which is the master of Group B, receives the group leaving request from the wireless speaker 1-6, and removes the wireless speakers 1-6 and 1-7 of Subgroup C which are identified from information included in the group leaving request from the members of Group B (Step S132).

The wireless speaker 1-4 then transmits a group leaving notification including information of Group B to each of the wireless speakers 1-6 and 1-7 of Subgroup C (Step S133). In response, the wireless speakers 1-6 and 1-7 of Subgroup C each clear the registered settings of Group B. The wireless speaker 1-4 then removes the wireless speakers 1-6 and 1-7 from the transmission destinations of the reproduced data of the audio data, and transmits the reproduced data of the audio data to the wireless speaker 1-5 alone (Step S134). In this manner, the wireless speakers 1-6 and 1-7 of Subgroup C leave Group B and stop outputting the audio data being reproduced in Group B.

Next, the wireless speaker 1-6 selects a master of a group to join out of the wireless speakers 1-1 and 1-4 from which the master notifications have been received in the given order (for example, the order of reception of the master notifications). Here, the wireless speaker 1-1, which is the sender of the master notification received second, is selected. The wireless speaker 1-6 then confirms its own state of belonging to Subgroup C, that is, presence of settings of Subgroup C registered in itself, and transmits a group joining request including information of Subgroup C (address information or the like of the wireless speakers 1-6 and 1-7 belonging to Subgroup C) to the selected wireless speaker 1-1 by near field communication (Step S135).

The wireless speaker 1-1, which is the master of Group A, receives the group joining request from the wireless speaker 1-6, and adds the wireless speakers 1-6 and 1-7 of Subgroup C which are identified from the information included in the group joining request to group members of its own group A (Step S136).

The wireless speaker 1-1 then transmits a group joining notification including information of Group A to each of the wireless speakers 1-6 and 1-7 of Subgroup C (Step S137). The wireless speaker 1-1 then adds the wireless speakers 1-6 and 1-7 to transmission destinations of reproduced data of audio data, and transmits the reproduced data of the audio data to the wireless speakers 1-2, 1-3, 1-6, and 1-7 by near field communication (Step S138). In this manner, the wireless speakers 1-6 and 1-7 of Subgroup C joins Group A and outputs audio data being reproduced in Group A.

Details of the wireless speakers 1 are described next.

Figure 5:
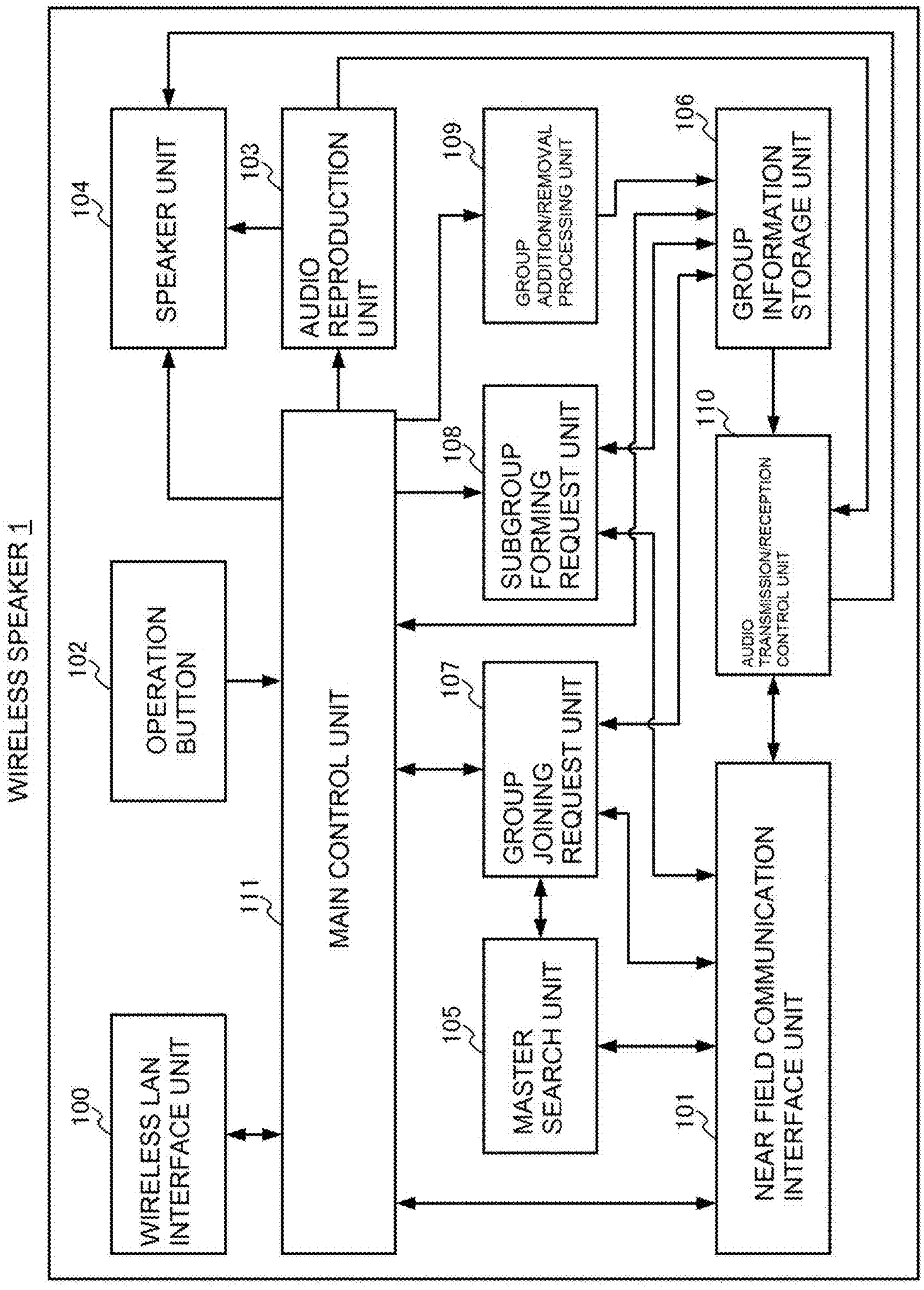
FIG. 5 is a diagram of a schematic function configuration of wireless speakers (1).

FIG. 5 is a diagram of a schematic function configuration of the wireless speakers 1.

The function configuration of the wireless speakers 1 illustrated in FIG. 5 is implemented on a computer including, for example, a central processing unit (CPU), a memory, an auxiliary storage device which is a flash memory, a hard disk drive, or the like, a communication device which is a network interface card (NIC), a wireless LAN adapter, a Bluetooth (trademark) adapter, or the like, and an input/output device which is a speaker, and operation button, and the like, by the CPU loading a given program from the auxiliary storage device onto the memory and executing the program.

As illustrated in the figure, the wireless speakers 1 each include a wireless LAN interface unit 100, a near field communication interface unit 101, an operation button 102, an audio reproduction unit 103, a speaker unit 104, a master search unit 105, a group information storage unit 106, a group joining request unit 107, a subgroup forming request unit 108, a group addition/removal processing unit 109, an audio transmission/reception control unit 110, and a main control unit 111.

The wireless LAN interface unit 100 is an interface for communication to and from the media server 5 via the access point 3 and the network 4.

The near field communication interface unit 101 is an interface for communication to and from other wireless speakers 1 and the controller 2 by Bluetooth (trademark) or other standards of near field communication.

The operation button 102 is a push button for receiving the group joining operation and the subgroup forming operation from the user. For example, the group joining operation is received from the user with a short press (a press lasting, for example, less than 1 second) of the button, and the subgroup forming operation is received from the user with a long press (a press lasting, for example, 5 seconds or longer) of the button.

The audio reproduction unit 103 follows, when its own wireless speaker 1 is set as a master, an instruction of the main control unit 111 to download audio data of a tune from the media server 5 via the wireless LAN interface unit 100, and reproduce the audio data.

The speaker unit 104 outputs, in the form of audio, reproduced data of the audio data reproduced by the audio reproduction unit 103.

The master search unit 105 searches for masters among other wireless speakers 1 to and from which communication can be held via the near field communication interface unit 101, by multicasting a master inquiry from the near field communication interface unit 101 and receiving master notifications.

The group information storage unit 106 stores information of a group and a subgroup that are joined by its own wireless speaker 1.

FIG. 6 is a diagram for schematically illustrating an example of contents registered in the group information storage unit 106.

As illustrated in the figure, the group information storage unit 106 includes a group information table 1061 for registering, when there is a group joined by its own wireless speaker 1, information of the joined group and a subgroup information table 1062 for registering, when there is a subgroup joined by its own wireless speaker 1, information of the joined subgroup.

In the group information table 1061, a record 10610 of group member information is stored for each group member of the group joined by its own wireless speaker 1, in association with a group name 10614 of the group. The record 10610 of the group member information includes a field 10611 for registering a speaker ID by which the wireless speaker 1 is identified, a field 10612 for registering address information of the wireless speaker 1, and a field 10613 for registering, when the wireless speaker 1 is a master, a master flag indicating that fact.

In the subgroup information table 1062, a record 10620 of subgroup member information is stored for each member of a subgroup joined by its own wireless speaker 1. The record 10620 of the subgroup member information includes a field 10621 for registering a speaker ID by which the wireless speaker 1 is identified, and a field 10622 for registering address information of the wireless speaker 1.

The group joining request unit 107 causes, when its own wireless speaker 1 is not set as a master, its own wireless speaker 1 (a subgroup when there is a subgroup joined by its own wireless speaker 1) to join a group of one of masters found through a search by the master search unit 105, by following an instruction of the main control unit 111.

The subgroup forming request unit 108 forms, when its own wireless speaker 1 is not set as a master, a subgroup with other wireless speakers 1 by following an instruction of the main control unit 111.

The group addition/removal processing unit 109 executes, when its own wireless speaker 1 is set as a master, processing of adding another wireless speaker 1 to a group to which its own wireless speaker 1 belongs, and processing of removing another wireless speaker 1 from the group.

The audio transmission/reception control unit 110 transmits, when its own wireless speaker 1 is set as a master, reproduced data of audio data reproduced by the audio reproduction unit 103 to other wireless speakers 1 of the group to which its own wireless speaker 1 belongs via the near field communication interface unit 101, by referring to the group information table 1061 of the group information storage unit 106. When its own wireless speaker 1 is not set as a master, the audio transmission/reception control unit 110 receives, via the near field communication interface unit 101, reproduced data of audio data from a master of a group to which its own wireless speaker 1 belongs, and outputs the reproduced data from the speaker unit 104.

The main control unit 111 performs overall control on the units 100 to 110 of the wireless speaker 1. The main control unit 111 follows instructions received from the controller 2 via the near field communication interface unit 101 to register information of a group to which its own wireless speaker 1 belongs in the group information table 1061 of the group information storage unit 106, and to set its own wireless speaker 1 as a master. When its own wireless speaker 1 is set as a master, the main control unit 111 follows an instruction received from the controller 2 via the near field communication interface unit 101 to download audio data of a tune from the media server 5 via the wireless LAN interface unit 101, and reproduce the audio data with the audio reproduction unit 103. When its own wireless speaker 1 is not set as a master, the main control unit 111 follows instructions received from the user via the operation button 102 to cause its own wireless speaker 1 (a subgroup when there is a subgroup joined by its own wireless speaker 1) to join a group in cooperation with the group joining request unit 107, and to form a subgroup including its own wireless speaker 1 in cooperation with the subgroup forming request unit 108.

Figure 7:
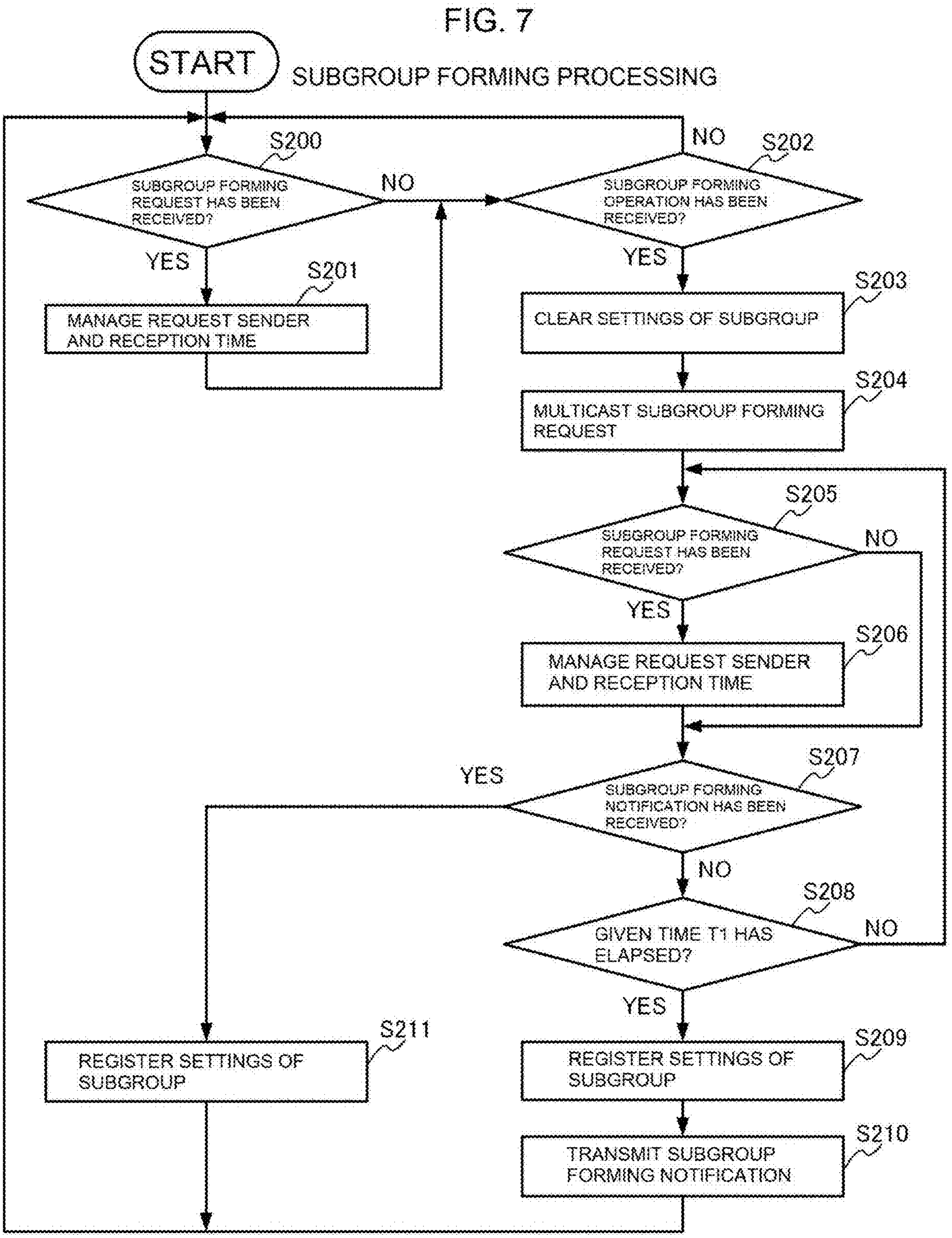
FIG. 7 is a flow chart for illustrating subgroup forming processing of the wireless speakers (1).

FIG. 7 is a flow chart for illustrating subgroup forming processing of the wireless speakers 1. This flow is executed when the own wireless speaker 1 is not set as a master.

First, the subgroup forming request unit 108 receives a subgroup forming request via the near field communication interface unit 101 ("YES" in Step S200), and manages the wireless speaker 1 that is the sender of the subgroup forming request in association with a reception time at which the subgroup forming request has been received (Step S201).

Next, the main control unit 111 receives the given subgroup forming operation, which is a long press (a press lasting, for example, 5 seconds or longer) of the operation button 102 or the like, from the user ("YES" in Step S202), clears settings of a subgroup by deleting every record 10620 of subgroup member information from the subgroup information table 1062 of the group information storage unit 106 (Step S203), and instructs the subgroup forming request unit 108 to form a subgroup. In response, the subgroup forming request unit 108 multicasts a subgroup forming request from the near field communication interface unit 101 (Step S204). The subgroup forming request unit 108 subsequently waits for reception of a subgroup forming notification via the near field communication interface unit 101 (Step S207), or elapse of the given time T1 (for example, 10 seconds) since the reception of the subgroup forming operation (Step S208).

Here, the subgroup forming request unit 108 has not received a subgroup forming notification ("NO" in Step S207) and the given time T1 has not elapsed since the reception of the subgroup forming operation ("NO" in Step S208). Under this state, the subgroup forming request unit 108 receives a subgroup forming request via the near field communication interface unit 101 ("YES" in Step S205), and manages the wireless speaker 1 that is the sender of the subgroup forming request in association with a reception time at which the subgroup forming request has been received (Step S206).

When the given time T1 has elapsed since the reception of the subgroup forming operation ("YES" in Step S208) without receiving a subgroup forming notification ("NO" in Step S207), the subgroup forming request unit 108 refers to the wireless speaker 1 managed in association with the reception time of the subgroup forming request, and determines the wireless speaker 1 that is the sender of the subgroup forming request received within the given time T1 before and after the reception of the subgroup forming operation to be a subgroup member of a subgroup to be newly formed, along with its own wireless speaker 1. The subgroup forming request unit 108 then registers settings of the newly formed subgroup by adding, to the subgroup information table 1062 of the group information storage unit 106, the record 10620 of subgroup member information of each wireless speaker 1 determined to be a subgroup member (including its own wireless speaker 1) (Step S209). The subgroup forming request unit 108 then transmits, via the near field communication interface unit 101, to each of the other wireless speakers 1 determined to be subgroup members, a subgroup forming notification including the record 10620 of subgroup member information of each subgroup member (Step S210).

When a subgroup forming notification is received ("YES" in Step S207) before the given time T1 since the reception of the subgroup forming operation elapses ("NO" in Step S208), the subgroup forming request unit 108 confirms that the record 10620 of its own wireless speaker 1 is included among the record 10620 of subgroup member information of each subgroup member included in the subgroup forming notification, and registers settings of the subgroup by adding the record 10620 of subgroup member information of each subgroup member to the subgroup information table 1062 of the group information storage unit 106 (Step S211).

Figure 8:
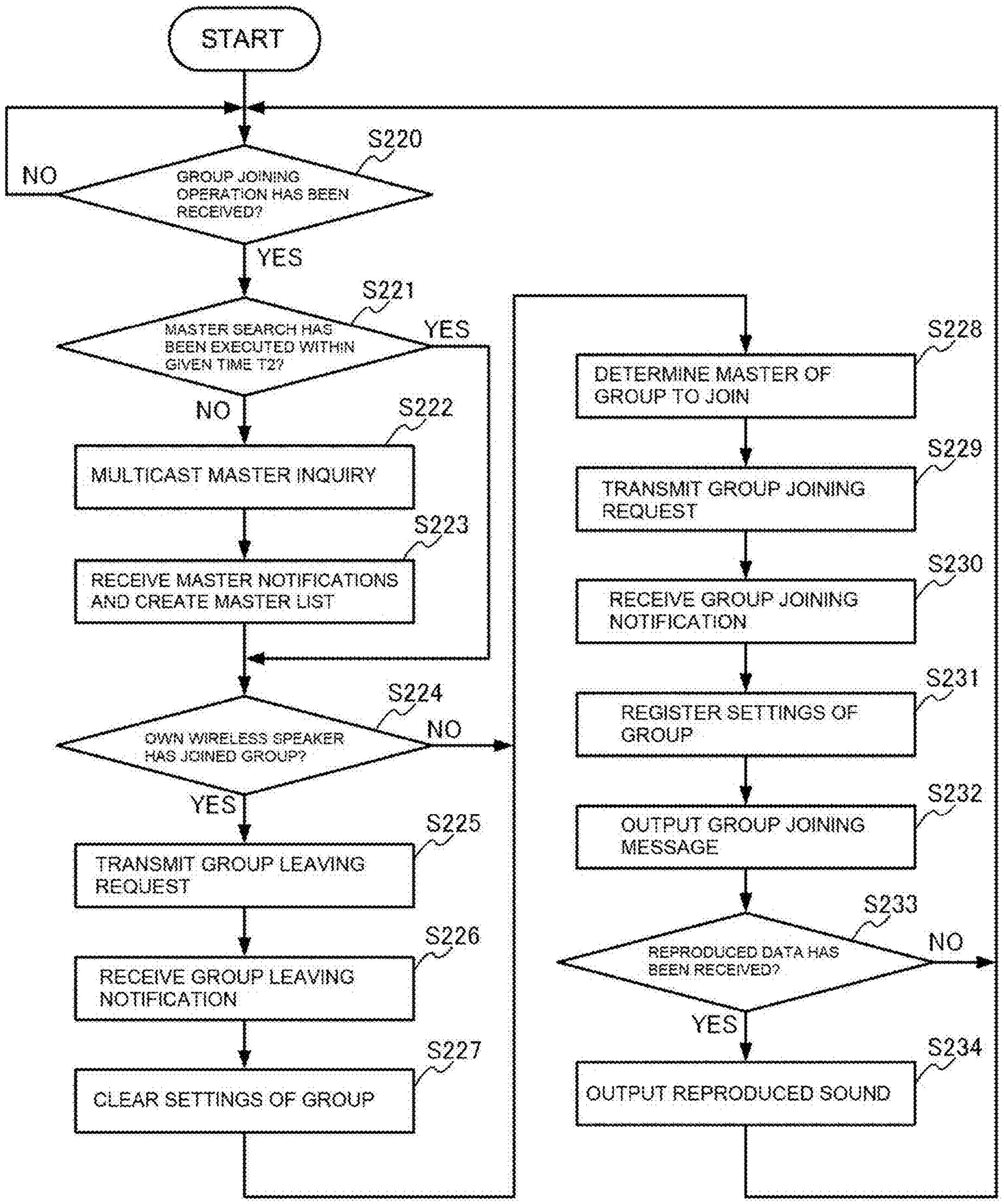
FIG. 8 is a flow chart for illustrating group joining request processing of the wireless speakers (1).

FIG. 8 is a flow chart for illustrating group joining request processing of the wireless speakers 1. This flow is executed when the own wireless speaker 1 is not set as a master.

First, the main control unit 111 receives given group joining operation, which is a short press (a press lasting, for example, less than 1 second) of the operation button 102 or the like, from the user ("YES" in Step S220), and instructs the group joining request unit 107 to join a group. In response, the group joining request unit 107 examines whether a search for masters by the master search unit 105 has been executed within a given time T2 (for example, 3 minutes). When it is found out that the search has been executed within the given time T2 ("YES" in Step S221), the process proceeds to Step S224.

When it is found out that a search for masters by the master search unit 105 has not been executed within the given time T2 ("NO" in Step S221), on the other hand, the group joining request unit 107 instructs the master search unit 105 to search for masters. In response, the master search unit 105 multicasts a master inquiry from the near field communication interface unit 101 (Step S222). The master search unit 105 then receives master notifications within a given time (for example, 5 seconds), and creates a master list in which the wireless speakers 1 set as masters are listed in the order of, for example, reception of the master notifications (Step S223). The process then proceeds to Step S224.

In Step S224, the group joining request unit 107 refers to the group information table 1061 of the group information storage unit 106, and examines whether the record 10610 of group member information including its own wireless speaker 1 is registered in the group information table 1061, to thereby determine whether its own wireless speaker 1 has already joined one of groups. When it is determined that its own wireless speaker 1 has not joined any group ("NO" in Step S224), the process proceeds to Step S228.

When it is determined that its own wireless speaker 1 has joined one of the groups ("YES" in Step S224), the group joining request unit 107 identifies the record 10610 of group member information in which the master flag is registered in the field 10613 from among records of the group information table 1061. The group joining request unit 107 then transmits, via the near field communication interface unit 101, a group leaving request to a master of the group joined by its own wireless speaker 1 which is identified from this record 10610 (Step S225). When its own wireless speaker 1 belongs to a subgroup (when the record 10620 of subgroup member information is registered in the subgroup information table 1062 of the group information storage unit 106), the transmitted group leaving request includes information of each of subgroup members including its own wireless speaker 1. When its own wireless speaker does not belong to any subgroup (when the record 10620 of subgroup member information is not registered in the subgroup information table 1062 of the group information storage unit 106), the transmitted group leaving request includes information of its own wireless speaker 1.

The group joining request unit 107 then receives, via the near field communication interface unit 101, a group leaving notification from the master that is the transmission destination of the group leaving request (Step S226), and clears settings of the group by deleting every record 10610 of group member information from the group information table 1061 (Step S227). The process proceeds to Step S228.

In Step S228, the group joining request unit 107 determines a master of a group to join, based on the latest master list (Step S228). For example, when it is found out in Step S224 that its own wireless speaker 1 has not joined any group ("NO" in Step S224), the group joining request unit 107 determines a master listed at the top of the master list as the master of the group to join, and, when it is found out in Step S224 that its own wireless speaker 1 has joined a group ("YES" in Step S224), determines a master listed next to a master of a group that has just been left by its own wireless speaker 1 on the master list (when the master of the group that has just been left by its own wireless speaker 1 is listed last on the master list, a master listed at the top of the master list) as the master of the group to join.

Next, the group joining request unit 107 transmits, via the near field communication interface unit 101, a group joining request to the master of the group to join (Step S229). When its own wireless speaker 1 belongs to a subgroup, the transmitted group joining request includes information of each of subgroup members including its own wireless speaker 1. When its own wireless speaker 1 does not belong to any subgroup, the transmitted group joining request includes information of its own wireless speaker 1.

The group joining request unit 107 then receives, via the near field communication interface unit 101, a group joining notification from the master that is the transmission destination of the group joining request (Step S230), and registers settings of the group by registering, in the group information table 1061, for each group member of the group to join, the record 10610 of group member information included in the group joining notification, in association with the group name 10614 of the group to join (Step S231).

Next, the group joining request unit 107 notifies, to the main control unit 111, the group name of the group to join and information (a speaker ID and/or address information) of the master of the group to join. In response, the main control unit 111 outputs a group joining message containing the group name of the group to join from the speaker unit 104 (Step S232). For example, when its own wireless speaker 1 is given a speaker name, a group joining message to the effect that "oo (the speaker name) speaker has joined oo (the group name) group" is output from the speaker unit 104. When its own wireless speaker 1 is not given a speaker name, a group joining message to the effect that "this speaker has joined oo (the group name) group" is output from the speaker 104. The audio transmission/reception control unit 110 receives reproduced data of audio data from the master of the group to join via the near field communication interface unit 101 ("YES" in Step S233), and outputs the reproduced data from the speaker unit 104 (Step S234).

Figure 9:
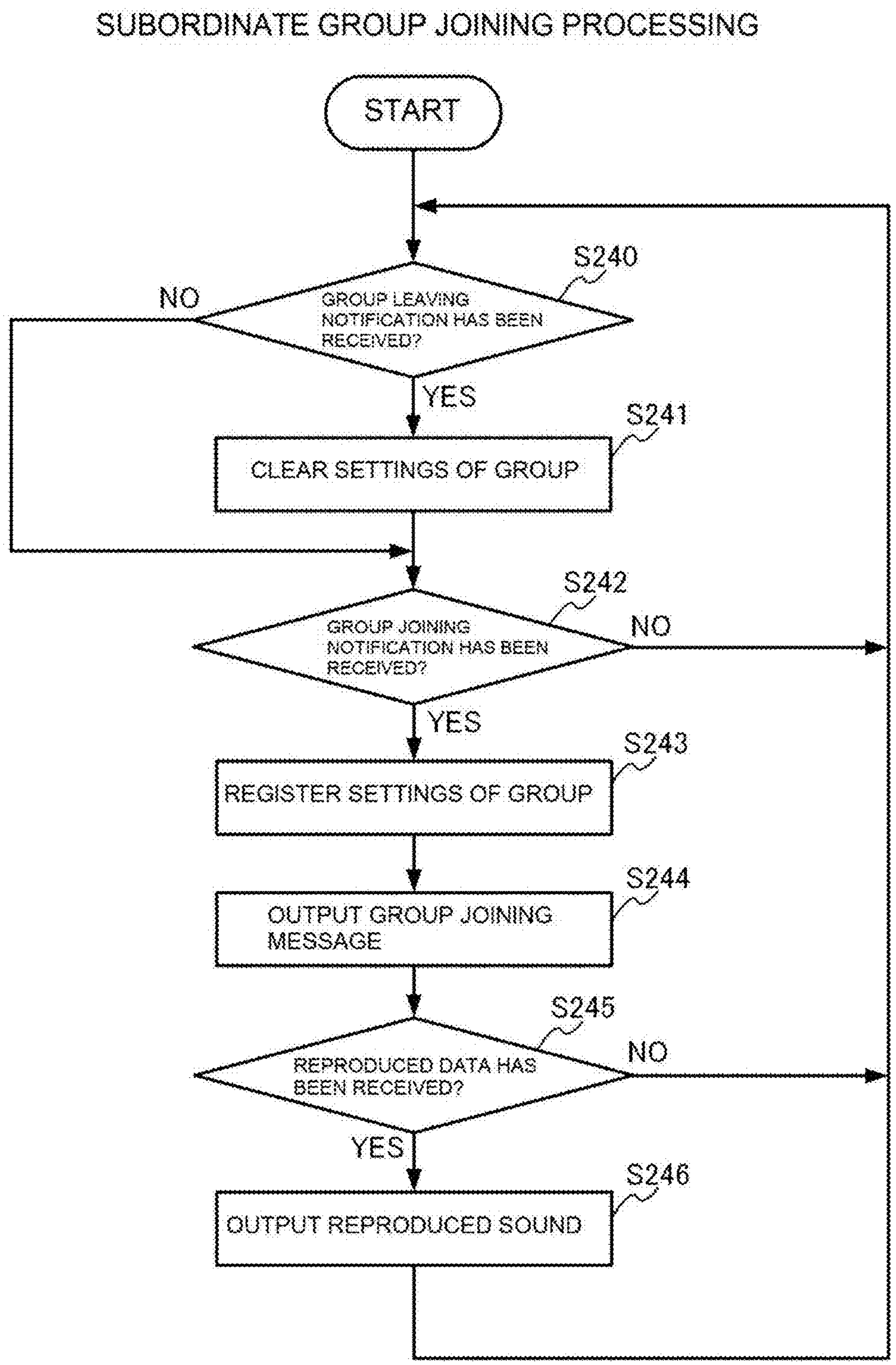
FIG. 9 is a flow chart for illustrating subordinate group joining processing of the wireless speakers (1).

FIG. 9 is a flow chart for illustrating subordinate group joining processing of the wireless speakers 1. This flow is executed when the own wireless speaker 1 is not set as a master and belongs to a subgroup.

The group joining request unit 107 receives a group leaving notification via the near field communication interface unit 101 ("YES" in Step S240), and clears settings of the group by deleting every record 10610 of group member information from the group information table 1061 of the group information storage unit 160 (Step S241).

The group joining request unit 107 receives a group joining notification via the near field communication interface unit 101 ("YES" in Step S242), and registers settings of the group by registering, in the group information table 1061, for each group member of the group to join, the record 10610 of group member information included in the group joining notification, in association with the group name 10614 of the group to join (Step S243).

The group joining request unit 107 then notifies, to the main control unit 111, the group name of the group to join and information (a speaker ID and/or address information) of the master of the group to join. In response, the main control unit 111 outputs a group joining message containing the group name of the group to join from the speaker unit 104 (Step S244). For example, when its own wireless speaker 1 is given a speaker name, a group joining message to the effect that "oo (the speaker name) speaker has joined 00 (the group name) group" is output from the speaker unit 104. When its own wireless speaker 1 is not given a speaker name, a group joining message to the effect that "this speaker has joined oo (the group name) group" is output from the speaker 104. The audio transmission/reception control unit 110 receives reproduced data of audio data from the master of the group to join via the near field communication interface unit 101 ("YES" in Step S245), and outputs the reproduced data from the speaker unit 104 (Step S246).

Figure 10:
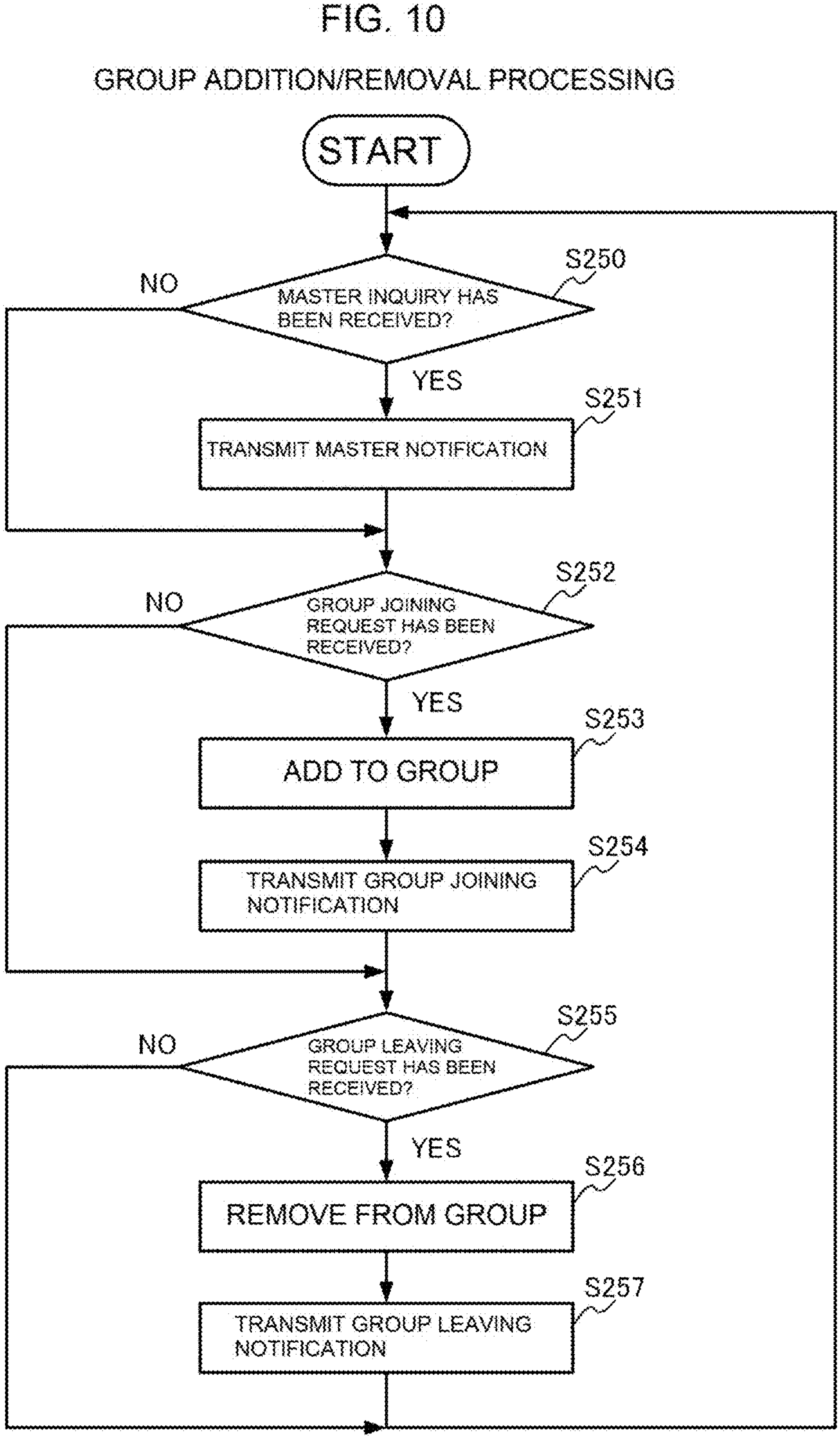
FIG. 10 is a flow chart for illustrating group addition/removal processing of the wireless speakers (1).

FIG. 10 is a flow chart for illustrating group addition/removal processing of the wireless speakers 1. This flow is executed when the own wireless speaker 1 is set as a master.

The main control unit 111 receives a master inquiry from another wireless speaker 1 via the near field communication interface unit 101 ("YES" in Step S250), refers to the group information table 1061 of the group information storage unit 106, and transmits, via the near field communication interface unit 101, a master notification including the group name 10614 and the record 10610 of group member information of each group member to the wireless speaker 1 that is the sender of the master inquiry (Step S251).

The main control unit 111 receives a group joining request from another wireless speaker 1 via the near field communication interface unit 101 ("YES" in Step S252), and hands the group joining request over to the group addition/removal processing unit 109. In response, the group addition/removal processing unit 109 registers, for each wireless speaker 1 having information included in the group joining request, the record 1061 of group member information that includes this information in the group information table 1061 of the group information storage unit 106. In this manner, each wireless speaker 1 having information included in the group joining request is added to a group to which its own wireless speaker 1 belongs as the master (Step S253). The main control unit 111 then transmits, via the near field communication interface unit 101, a group joining notification including the record 10610 of group member information of each group member that is included in the group information table 1061 and the group name 10614 to each wireless speaker 1 that is identified by the information included in the group joining request (Step S254).

The main control unit 111 receives a group leaving request from another wireless speaker 1 via the near field communication interface unit 101 ("YES" in Step S255), and hands the group leaving request over to the group addition/removal processing unit 109. In response, the group addition/removal processing unit 109 deletes, for each wireless speaker 1 having information included in the group leaving request, the record 1061 of group member information that includes this information from the group information table 1061 of the group information storage unit 106. In this manner, each wireless speaker 1 having information included in the group leaving request is removed from a group to which its own wireless speaker 1 belongs as the master (Step S256). The main control unit 111 then transmits, via the near field communication interface unit 101, a group leaving notification to each wireless speaker 1 that is identified by the information included in the group leaving request (Step S257).

Figure 11:
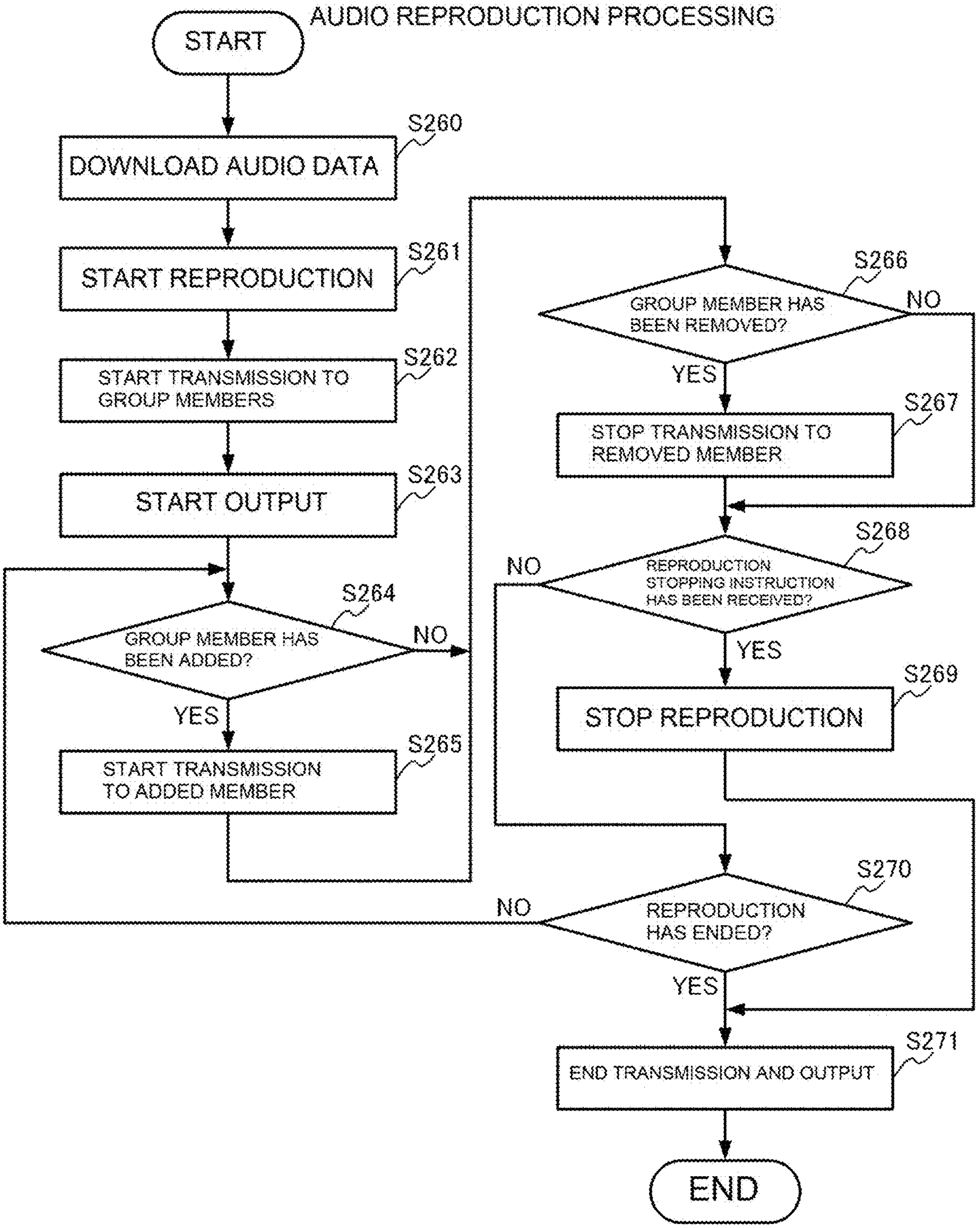
FIG. 11 is a flow chart for illustrating audio reproduction processing of the wireless speakers (1).

FIG. 11 is a flow chart for illustrating audio reproduction processing of the wireless speakers 1. This flow is executed when the control unit 111 of the wireless speaker 1 set as a master receives an audio reproduction instruction accompanied by specification of a tune from the controller 2 via the wireless LAN interface unit 100.

First, the main control unit 111 accesses the media server 5 via the wireless LAN interface unit 100 and downloads audio data of the tune specified in the audio reproduction instruction received from the controller 2 (Step S260). The main control unit 111 hands the downloaded audio data over to the audio reproduction unit 103 and instructs the audio reproduction unit 103 to reproduce the audio data. In response, the audio reproduction unit 103 starts reproducing the audio data received from the main control unit 111 (Step S261).

Next, the audio transmission/reception control unit 110 refers to the group information table 1061 of the group information storage unit 106, and transmits, via the near field communication interface unit 101, the reproduced data of the audio data reproduced by the audio reproduction unit 103 to each of other wireless speakers 1 that are group members of a group to which its own wireless speaker 1 belongs (Step S262). The audio reproduction unit 103 starts output of the reproduced data from the speaker unit 104 with output timing delayed so that timing at which the reproduced data transmitted to the group members by the audio transmission/reception control unit 110 is output is the same throughout the group members (Step S263).

After that, the audio transmission/reception control unit 110 monitors the group information table 1061 of the group information storage unit 106. When the record 10610 of group member information is registered in the group information table 1061, which means that a new group member is added to the group to which its own wireless speaker 1 belongs ("YES" in Step S264), the audio transmission/reception control unit 110 starts transmitting the reproduced data to the added group member (Step S265). When the record 10610 of group member information is deleted from the group information table 1061, which means that a group member is removed from the group to which its own wireless speaker 1 belongs ("YES" in Step S266), the audio transmission/reception control unit 110 stops transmitting the reproduced data to the removed group member (Step S267).

The main control unit 111 receives an audio reproduction stopping instruction from the controller 2 via the wireless LAN interface unit 100 ("YES" in Step S268), and instructs the audio reproduction unit 103 to stop reproducing the audio data.

In response, the audio reproduction unit 103 stops reproducing the audio data (Step S269). This causes the audio transmission/reception control unit 110 to end the transmission of the reproduced data to each group member of the group to which its own wireless speaker 1 belongs, and the speaker unit 104 to end the output of the reproduced data (Step S271).

Similarly, when the audio reproduction unit 103 ends the reproduction of the audio data ("YES" in Step S270), the audio transmission/reception control unit 110 ends the transmission of the reproduced data to each group member of the group to which its own wireless speaker 1 belongs, and the speaker unit 104 ends the output of the reproduced data (Step S271).

This concludes the description of the one embodiment of the present invention.

In this embodiment, when given group joining operation is received from the user, the wireless speaker 1 that has not joined any group transmits a group joining request to one of masters, and joins a group to which this master belongs, and the wireless speaker 1 that has already joined one of groups transmits a group leaving request to a master of this group to leave this group, and then transmits a group joining request to one of the masters other than the transmission destination of the group leaving request to join a group to which the one of the masters belongs. It is therefore unrequired, when the controller 2 is implemented by application software installed in a smartphone or a similar information terminal, to go to the trouble of activating and operating the application for joining of the wireless speaker 1 to one of the groups. In addition, immediate output of reproduced data of audio data being reproduced in the group newly joined by the wireless speaker 1 enables the user to determine the group joined by the wireless speaker by checking the audio data being reproduced. According to this embodiment, joining of one wireless speaker 1 to a group can thus be accomplished by simple operation.

In this embodiment, when given group joining operation is received from the user, the wireless speaker 1 that belongs to a subgroup and that does not belong to any group transmits a group joining request including information of every wireless speaker 1 belonging to the subgroup to one of masters so that every wireless speaker 1 belonging to the subgroup joins the same group, and the wireless speaker 1 that belongs to a subgroup and that has already joined one of groups transmits a group leaving request including specification of every wireless speaker 1 belonging to the subgroup to a master of this group so that every wireless speaker 1 belonging to the subgroup leaves this group, and transmits a group joining request including information of every wireless speaker 1 belonging to the subgroup to one of the masters other than the master of this group so that every wireless speaker 1 belonging to the subgroup joins the same group. According to this embodiment, all wireless speakers 1 belonging to a subgroup can thus join the same group by execution of the given group joining operation on any one of the wireless speakers belonging to the subgroup, and this improves user-friendliness.

In this embodiment, the wireless speaker 1 that has received given subgroup forming operation from the user multicasts a subgroup forming request, and forms a subgroup together with another wireless speaker 1 that is the sender of a subgroup forming request received within the given time T1 before and after the reception of the subgroup forming operation. It is therefore unrequired, when the controller 2 is implemented by application software installed in a smartphone or a similar information terminal, to go to the trouble of activating and operating the application for forming of a subgroup. According to this embodiment, a subgroup can thus be formed by simple operation.

In this embodiment, the group joining operation and the subgroup forming operation are received from the user by simple operation (a long press, a short press, and the like) of the operation button 102 provided on each wireless speaker 1. The user-friendliness is thus improved.

The present invention is not limited to the embodiment described above, and various modifications may be made thereto within the scope of the gist of the present invention.

For example, in the embodiment described above, the group joining operation and the subgroup forming operation are received from the user by simple operation (a long press, a short press, and the like) of the operation button 102 provided on each wireless speaker 1, but the present invention is not limited thereto. Each wireless speaker 1 may be provided with, instead of the operation button 102, a microphone and a voice recognition processing unit which performs voice recognition processing on a sound input to the microphone so that group joining operation and subgroup forming operation are received from the user by voice operation.

In the embodiment described above, when the wireless speaker 1 set as a master receives a group joining request from another wireless speaker 1, the wireless speaker 1 set as a master unconditionally adds, to its own group, each of other wireless speakers 1 having information included in the group joining request, but the present invention is not limited thereto. The wireless speaker 1 set as a master may output, when receiving a group joining request from another wireless speaker 1, an inquiry message to ask whether the wireless speakers 1 having information included in the group joining request are allowed to be added to the group of the wireless speaker 1 set as a master so that the wireless speakers 1 having information included in the group joining request are added to the group of the wireless speaker 1 set as a master only when permission is received by operation of the operation button 102 or by voice operation. When addition to the group is rejected by operation of the operation button 102 or by voice operation, the wireless speakers 1 having information included in the group joining request are not added to the group of the wireless speaker 1 set as a master. In this case, it is preferred that the wireless speaker 1 set as a master transmit a group addition rejection message containing the group name of its own group of the wireless speaker 1 set as a master to the sender of the group joining request, and that the wireless speaker 1 that is the sender of the group joining request output, in response, an audio message to the effect that addition to a group identified by the group name included in the group addition rejection message has been rejected.

In the embodiment described above, the wireless speakers 1 transmit and receive various types of information including a master inquiry to and from one another by near field communication, but may use wireless communication via the access point 3 to transmit and receive information to and from one another.

In the embodiment described above, a group may be dissolved, for example, as follows. Specifically, when an instruction to dissolve a group is received by operation of the operation button 102 or by voice operation, the wireless speaker 1 set as a master transmits a group dissolution notification to each of the wireless speakers 1 belonging to a group of the wireless speaker 1 set as a master, and clears the group information table 1061. When audio data is being reproduced at that point, transmission of the reproduced data to those wireless speakers 1 is stopped. Meanwhile, the wireless speakers 1 that have received the group dissolution notification each clear the group information table 1061. For example, when a group dissolution instruction is input to the wireless speaker 1-4 by operating the operation button 102 of the wireless speaker 1-4 or by voice operation under a state in which the wireless speaker 1-4 and the wireless speaker 1-5 form Group B, and the wireless speaker 1-4 is set as a master as illustrated in FIG. 1, Group B is dissolved and the wireless speaker 1-4 and the wireless speaker 1-5 no longer belong to any group.

The description given above on the embodiment takes as an example a case in which the wireless speaker 1 set as a master downloads audio data of a tune to be reproduced from the media server 5. However, the method of obtaining audio data of a tune to be reproduced is not limited thereto. For example, the wireless speaker 1 set as a master may read audio data of a tune to be reproduced out of a USB memory, a CD-ROM, or other storage media.

The description given above on the embodiment takes as an example the wireless speakers 1 connected by wireless connection to the network 4 via the access point 3. However, the present invention is not limited thereto. The present invention is applicable also to speakers connected by wired connection to the network 4 with the use of a LAN cable.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. A "system" can be hardware or software operating in conjunction with hardware, and the term "means" as used in the specification is not the same as the term "means" as used in a claim and is not intended to invoke the provisions of the 35 U.S.C. 112(6), but rather is the Japanese language equivalent for a system. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCE SIGNS LIST

1, 1-1 to 1-7: wireless speaker, 2: controller, 3: access point, 4: network, 5: media server 100: wireless LAN interface unit, 101: near field communication interface unit, 102: operation button, 103: audio reproduction unit, 104: speaker unit, 105: master search unit, 106: group information storage unit, 107: group joining request unit, 108: subgroup forming request unit, 109: group addition/removal processing unit, 110: audio transmission/reception control unit, 111 main control unit

The invention claimed is:

1. A wireless audio system having a configuration in which each of groups is formed from one or more wireless speakers, and masters are selected for the groups on a one-to-one basis so that one master selected for a group from the one or more wireless speakers belonging to the group reproduces audio data and transmits the reproduced audio data to each of the one or more wireless speakers belonging to the group, wherein each of the wireless speakers includes:

a master search unit configured to search for the masters;

a group joining request unit configured to transmit, when given group joining operation is received from a user and the each of the wireless speakers does not belong to any of the groups, a group joining request to one of the masters found through a search by the master search unit to join one of the groups to which the one of the masters belongs, and to transmit, when the given group joining operation is received from the user and the each of the wireless speakers belongs to one of the groups, a group leaving request to the master of the one of the groups to leave the one of the groups, and transmit a group joining request to one of the masters that is found through the search by the master search unit and is other than the master of the one of the groups, to join a group to which the one of the masters belongs;

a group joining request unit configured to add, when the each of the wireless speakers is set as the master and a group joining request is received from another of the wireless speakers, the wireless speaker that is a sender of the group joining request to a group of the each of the wireless speakers;

the group joining request unit configured to transmit a group leaving request to remove, when the each of the wireless speakers is set as the master and a group leaving request is received from one of the other wireless speakers belonging to the group of the each of the wireless speakers, the wireless speaker that is a sender of the group leaving request from the group of the each of the wireless speakers; and an audio transmission control unit configured to transmit, when the each of the wireless speakers is set as the master and one of the other wireless speakers is added to the group of the each of the wireless speakers by the group joining unit during reproduction of audio data, the reproduced audio data to the added wireless speaker, and to stop, when the each of the wireless speakers is set as the master and one of the other wireless speakers is removed from the group of the each of the wireless speakers by the group leaving request, transmission of the reproduced data to the removed wireless speaker.

2. The wireless audio system according to claim 1, wherein the group joining request unit is configured to, when the each of the wireless speakers belongs to a subgroup to which no master is set and the given group joining operation is received from the user:

transmit, when the each of the wireless speakers does not belong to any of the groups, a group joining request including specification of every one of the wireless speakers belonging to the subgroup to one of the masters found through the search by the master search unit to cause the subgroup to join a group to which the one of the masters belongs; and transmit, when the each of the wireless speakers belongs to one of the groups, a group leaving request including specification of every one of the wireless speakers belonging to the subgroup to the master of the one of the groups to cause the subgroup to leave the one of the groups, and transmit a group joining request including specification of every one of the wireless speakers belonging to the subgroup to one of the masters that is other than the master of the one of the groups to cause the subgroup to join a group to which the one of the masters belongs, wherein the group joining request unit is configured to add, when the wireless speakers are specified in the received group joining request, every one of the wireless speakers specified in the group joining request to the group of the each of the wireless speakers, and wherein the group leaving request is configured to remove, when the wireless speakers are specified in the group leaving request, every one of the wireless speakers specified in the group leaving request from the group of the each of the wireless speakers.

3. The wireless audio system according to claim 2, wherein each of the wireless speakers further includes a subgroup forming operation configured to multicast a subgroup forming request when given subgroup forming operation is received from the user, and to form a subgroup with one of the other wireless speakers that is a sender of a subgroup forming request which has been received within a given period of time before and after reception of the given subgroup forming operation.

4. The wireless audio system according to claim 1, further comprising a button for receiving the given group joining operation from the user.

5. The wireless audio system according to claim 3, further comprising a button for receiving the given group joining operation and the given subgroup forming operation from the user.

6. The wireless audio system according to claim 1, further comprising a voice operation control operating on a processor and configured to receive the given group joining operation from the user by voice operation.

7. The wireless audio system according to claim 3, further comprising a voice operation control operating on a processor and configured to receive the given group joining operation and the given subgroup forming operation from the user by voice operation.

8. The wireless audio system according to claim 1, wherein the group joining request unit is configured to output a message informing of reception of the group joining request from one of the other wireless speakers, and add, when group joining permission operation is received from the user, the wireless speaker that is the sender of the group joining request to the group of the each of the wireless speakers.

9. A wireless speaker which is included in a wireless audio system having a configuration in which each of groups is formed from one or more wireless speakers, and masters are selected for the groups on a one-to-one basis so that one master selected for a group from the one or more wireless speakers belonging to the group reproduces audio data and transmits the reproduced audio data to each of the one or more wireless speakers belonging to the group, the wireless speaker comprising:

a master search unit operating on the processor and configured to search for the masters;

a group joining request unit configured to transmit, when given group joining operation is received from a user and the wireless speaker does not belong to any of the groups, a group joining request to one of the masters found through a search by the master search unit to join one of the groups to which the one of the masters belongs, and to transmit, when the given group joining operation is received from the user and the wireless speaker belongs to one of the groups, a group leaving request to the master of the one of the groups to leave the one of the groups, and transmit a group joining request to one of the masters that is found through the search by the master search unit and is other than the master of the one of the groups, to join a group to which the one of the masters belongs;

a group joining control operating on the processor and configured to add, when the wireless speaker is set as the master and a group joining request is received from another of the wireless speakers, the wireless speaker that is a sender of the group joining request to a group of the wireless speaker;

the group joining request unit configured to transmit a group leaving request remove, when the wireless speaker is set as the master and a group leaving request is received from one of the other wireless speakers belonging to the group of the wireless speaker, the wireless speaker that is a sender of the group leaving request from the group of the wireless speaker; and an audio transmission control unit configured to transmit, when the wireless speaker is set as the master and one of the other wireless speakers is added to the group of the wireless speaker by the group joining request unit during reproduction of audio data, the reproduced audio data to the added wireless speaker, and to stop, when the wireless speaker is set as the master and one of the other wireless speakers is removed from the group of the wireless speaker by the group leaving request, transmission of the reproduced data to the removed wireless speaker.

10. A group joining method for a wireless speaker in a wireless audio system having a configuration in which each of one or more groups is formed from one or more wireless speakers, and masters are selected for the groups on a one-to-one basis so that one master selected for a selected group from the one or more wireless speakers belonging to the selected group reproduces audio data and transmits the reproduced audio data to each of the one or more wireless speakers belonging to the selected group, the group joining method comprising:

searching, by each of the wireless speakers, for the masters;

transmitting, by the each of the wireless speakers, when a group joining operation is received from a user and the each of the wireless speakers does not belong to any of the groups, a group joining request to one of the masters to join one of the groups to which the one of the masters belongs, and transmitting, when the group joining operation is received from the user and the each of the wireless speakers belongs to one of the groups, a group leaving request to the master of the one of the groups to leave the one of the groups, and transmitting a group joining request to one of the masters other than the master of the one of the groups to join a group to which the one of the masters belongs;

adding, by one of the wireless speakers set as the master, when the group joining request is received from another of the wireless speakers, the wireless speaker that is a sender of the group joining request to a group of the one of the wireless speakers;

removing, by the one of the wireless speakers set as the master, when a group leaving request is received from one of the other wireless speakers belonging to the group of the one of the wireless speakers, the wireless speaker that is a sender of the group leaving request from the group of the one of the wireless speakers; and transmitting, by the one of the wireless speakers set as the master, when one of the other wireless speakers is added to the group of the one of the wireless speakers during reproduction of audio data, the reproduced audio data to the added wireless speaker, and stopping, when one of the other wireless speakers is removed from the group of the one of the wireless speakers, transmission of the reproduced data to the removed wireless speaker.

11. The method of claim 10 further comprising transmitting, when the each of the wireless speakers does not belong to any of the groups, the group joining request including a specification of one of the wireless speakers belonging to a subgroup.

12. The method of claim 10 further comprising transmitting, when the each of the wireless speakers does not belong to any of the groups, the group joining request including a specification of every one of the wireless speakers belonging to a subgroup.

13. The method of claim 10 further comprising causing a subgroup to join a group to which the one of the masters belongs.

14. The method of claim 10 further comprising transmitting, when the each of the wireless speakers belongs to one of the groups, a group leaving request including specification of one of the wireless speakers belonging to a subgroup.

15. The method of claim 10 further comprising transmitting, when the each of the wireless speakers belongs to one of the groups, a group leaving request including specification of every one of the wireless speakers belonging to a subgroup.

16. The method of claim 10 further comprising adding one of the wireless speakers specified in the group joining request to the group of the each of the wireless speakers.

17. The method of claim 10 further comprising adding every one of the wireless speakers specified in the group joining request to the group of the each of the wireless speakers.

18. The method of claim 10 further comprising removing, when the wireless speakers are specified in the group leaving request, one of the wireless speakers specified in the group leaving request from the group of the each of the wireless speakers.

19. The method of claim 10 further comprising removing, when the wireless speakers are specified in the group leaving request, every one of the wireless speakers specified in the group leaving request from the group of the each of the wireless speakers.

* * * * *